United States Patent
Ichishi et al.

(10) Patent No.: US 7,272,944 B2
(45) Date of Patent: Sep. 25, 2007

(54) VEHICLE AIR CONDITIONER WITH NON-CONTACT TEMPERATURE SENSOR

(75) Inventors: Yoshinori Ichishi, Kariya (JP); Tatsumi Kumada, Gamagori (JP)

(73) Assignee: DENSO Corporation, Kariya (JP)

( * ) Notice: Subject to any disclaimer, the term of this patent is extended or adjusted under 35 U.S.C. 154(b) by 390 days.

(21) Appl. No.: 10/781,194

(22) Filed: Feb. 18, 2004

(65) Prior Publication Data

US 2004/0163395 A1    Aug. 26, 2004

(30) Foreign Application Priority Data

Feb. 24, 2003  (JP) .............................. 2003-045677
Feb. 24, 2003  (JP) .............................. 2003-046126
Sep. 29, 2003  (JP) .............................. 2003-338107

(51) Int. Cl.
*F25B 49/00*   (2006.01)
*G05D 23/32*   (2006.01)

(52) U.S. Cl. ............................. 62/126; 62/127; 62/157; 62/158; 236/91 C

(58) Field of Classification Search .................. 62/157, 62/158, 126, 127; 236/91 C
See application file for complete search history.

(56) References Cited

U.S. PATENT DOCUMENTS 5,157,932 A * 10/1992 Noji et al. ..................... 62/126
5,408,837 A * 4/1995 Omura ........................... 62/89
6,202,934 B1 * 3/2001 Kamiya et al. ........... 236/91 C
6,397,615 B1 * 6/2002 Kawai et al. .................. 62/244
2002/0053601 A1   5/2002 Kamiya et al.

FOREIGN PATENT DOCUMENTS

JP    A-2001-347816    12/2001
JP    A-2002-172926     6/2002

* cited by examiner

*Primary Examiner*—Marc Norman
(74) *Attorney, Agent, or Firm*—Harness, Dickey & Pierce, PLC

(57) ABSTRACT

A vehicle air conditioner includes a non-contact temperature sensor for detecting a temperature in a predetermined area of a passenger compartment in non-contact, an air conditioning unit that controls an air conditioning state in the passenger compartment based on at least the temperature detected by the non-contact temperature sensor, and an air conditioning ECU for controlling the air conditioning unit. The ECU determines whether the temperature detected by the non-contact temperature sensor is abnormal, and informs a determination result to a user by using a light emitting diode. Thus, it is possible to notify the user whether the temperature detected by the non-contact temperature sensor is abnormal. The determination whether the detected temperature of the non-contact temperature sensor is abnormal can be performed by using at least one of the temperature detected by the non-contact temperature sensor and an environment condition.

17 Claims, 21 Drawing Sheets

PASSENGER
COMPARTMENT ⟷ BACK SIDE
SIDE

VEHICLE AIR CONDITIONER WITH NON-CONTACT TEMPERATURE SENSOR

CROSS REFERENCE TO RELATED APPLICATION

This application is based on Japanese Patent Applications No. 2003-45677 filed on Feb. 24, 2003, No. 2003-46126 filed on Feb. 24, 2003, and No. 2003-338107 filed on Sep. 29, 2003, the disclosure of which is incorporated herein by reference.

FIELD OF THE PRESENT INVENTION

The present invention relates to a vehicle air conditioner that performs air-conditioning of a passenger compartment on the basis of a temperature detected by a non-contact temperature sensor. More particularly, the present invention relates to an air-conditioning control operation by using the temperature detected by the non-contact temperature sensor.

BACKGROUND OF THE PRESENT INVENTION

There has been proposed a vehicle air conditioner that detects a temperature around a passenger in a passenger compartment by the use of an infrared temperature sensor in a non-contact manner and air-conditions the passenger compartment around the passenger automatically on the basis of a temperature detected by the temperature sensor (for example, see Japanese Unexamined Patent Publication No. 2002-172926).

In another vehicle air conditioner, a time constant processing is performed for a temperature detected by an infrared temperature sensor, and air-conditioning of a passenger compartment is performed on the basis of the detected and processed temperature (for example, see Japanese Unexamined Patent Publication No. 2001-347816). To be specific, the air conditioner air-conditions the passenger compartment by the use of the temperature detected a predetermined time before by the infrared temperature sensor. Thus, even if the surface temperature of a temperature detection area by the infrared temperature sensor changes rapidly, the air conditioner prevents the air state in the passenger compartment from being changed in response to a change in the surface temperature.

However, in this kind of vehicle air conditioner, in a case where a high- or low-temperature substance such as flame of tobacco or cooled air of a refrigerator (or cooled canned coffee) comes into the detection area of the infrared temperature sensor (that is, temperature detection area), the air state is not rapidly changed immediately after that time. However, after a predetermined time period, the air state is controlled by the use of the detection temperature showing a high temperature of the tobacco or the like. Thus, after the predetermined time period passes, the air state is abnormally controlled.

Even in a case where the detection surface of the infrared temperature sensor is covered with the passenger's hands, the air state is not rapidly changed immediately after that time. But, after a predetermined time period passes, the air state is controlled abnormally. On the contrary, even if the passenger holds his hands over the detection surface of the infrared temperature sensor for a try, the air state is hardly changed immediately after that time. Hence, this raises also a problem that the passenger may be given feelings of anxiety about whether or not air-conditioning control is really performed under normal operating conditions.

The inventors of the present application have made a study of detecting the surface temperature of a passenger (driver) sitting on the driver's seat by the use of an infrared temperature sensor that is arranged in a dashboard (i.e., instrument board) in the passenger compartment so as to face a driver's seat area. When the infrared temperature sensor is arranged nearer to a steering wheel side than a central portion in the dashboard, an area occupied by the steering wheel becomes larger in a temperature detection area where the infrared temperature sensor can detect temperature. For this reason, areas in which temperature essentially needs to be detected, for example, an area occupied by the driver and having the largest effect on a comfortable feeling, an area occupied by a ceiling and undergoing the effect of radiation from outside the passenger compartment, and an area occupied by side windows and undergoing the effect of outside air temperature and solar radiation amount are reduced. Hence, this causes large detection error in the temperature detected by the infrared temperature sensor. Therefore, it impossible to suitably adjust the air conditioning state in the passenger compartment.

SUMMARY OF THE PRESENT INVENTION

In view of the above problems, it is a first object of the present invention to provide a vehicle air conditioner that can inform a user of whether or not a temperature detected by a non-contact temperature sensor is normal.

It is a second object of the present invention to provide a vehicle air conditioner that can suitably adjust an air state on a driver's seat-side in a passenger compartment by the use of a non-contact temperature sensor.

It is a third object of the present invention to provide a control process which can readily and accurately determines whether or not a detection temperature of a non-contact temperature sensor is normal.

According to an aspect of the present invention, a vehicle air conditioner includes a non-contact temperature sensor that detects a temperature in a predetermined area of a passenger compartment in non contact, a control unit that controls an air state in the passenger compartment based on at least the temperature detected by the non-contact temperature sensor, a determining means for determining whether or not the temperature detected by the non-contact temperature sensor is abnormal, and a notifying means for notifying a passenger whether the temperature detected by the non-contact temperature sensor is abnormal. Therefore, it is possible to inform a user (passenger) whether or not the temperature detected by the non-contact temperature sensor is abnormal.

Preferably, the non-contact temperature sensor is disposed at an attachment position that is changeable in the passenger compartment. Thus, when the determining means determines that the temperature detected by the non-contact temperature sensor is abnormal, the attachment position of the non-contact temperature sensor is changed so that it can prevent an abnormally detected temperature of the non-contact temperature sensor. For example, the notifying means is a light emitting device that is arranged at a position near the non-contact temperature sensor. Alternatively, the notifying means displaces a determination result of the determining means by using a temperature displaying portion that displaces a set temperature for controlling the air state in the passenger compartment.

The determining means can determine whether the temperature detected by the non-contact temperature sensor at the present time is abnormal, based on a temperature detected by the non-contact temperature sensor at a time before a predetermined time period from the present time.

Preferably, the vehicle air conditioner further includes environment condition detection means for detecting an environment condition except for the temperature detected by the non-contact temperature sensor. In this case, the control unit controls the air state in the passenger compartment based on the temperature detected by the non-contact temperature sensor and the environment condition detected by the environment condition detection means. In this case, the determining means determines whether the temperature detected by the non-contact temperature sensor is normal, based on the environment condition detected by the environment condition detection means. Therefore, it is possible to detect whether the temperature detected by the non-contact temperature sensor is normal in accordance with a relationship between the temperature detected by the non-contact temperature sensor and the environment condition.

For example, the environment condition detection means is a solar radiation detecting means for detecting a solar radiation amount entering into the passenger compartment.

Alternatively, the determining means determines whether the temperature detected by the non-contact temperature sensor is normal, based on whether the temperature detected by the non-contact temperature sensor becomes within a predetermined range for a predetermined time. Alternatively, the determining means determines whether the temperature detected by the non-contact temperature sensor is normal, based on whether a state where the temperature detected by the non-contact temperature sensor is within a predetermined range is continued for a predetermined time.

Preferably, the environment condition detection means includes an outside air detection means for detecting a temperature of outside air outside the passenger compartment. In this case, the determining means determines that the temperature detected by the non-contact temperature sensor is normal when the temperature detected by the non-contact temperature sensor is close to the temperature of outside air, detected by the outside air temperature sensor. Alternatively, the determining means determines that the temperature detected by the non-contact temperature sensor is normal, when the opening state determining unit determines the opening state of the door or the window of the vehicle.

Preferably, when the determining means determines that the temperature detected by the non-contact temperature sensor is abnormal, a provisional temperature is set as the temperature in the predetermined area, and the control unit controls the air state in the passenger compartment based on the provisional temperature.

In addition, the determining means can determine whether the temperature detected at the present time by the non-contact temperature sensor is abnormal, based on the temperature detected at the last time by the non-contact temperature sensor and the temperature detected at the present time by the non-contact temperature sensor.

According to another aspect of the present invention, an air conditioner for a vehicle includes an air conditioning unit that is disposed to independently control an air conditioning state of a first zone at a side of a steering wheel in a vehicle lateral direction and an air conditioning state of a second zone at a side opposite to the steering wheel in the vehicle lateral direction, a first non-contact temperature sensor that detects a surface temperature of a first detection area in the first zone in non-contact, a second non-contact temperature sensor that detects a surface temperature of a second detection area in the second zone in non-contact, and a control means that controls the air conditioning state in the first zone based on the temperature detected by the first non-contact temperature sensor and controls the air conditioning state in the second zone based on the temperature detected by the second non-contact temperature sensor. In the vehicle air conditioner, the first non-contact temperature sensor is arranged in a dashboard to face the first zone, the second non-contact temperature sensor is arranged in the dashboard to face the second zone, the first non-contact temperature sensor is provided in the dashboard at a side opposite to the steering wheel with respect to a center portion of the dashboard in the vehicle lateral direction, and the second non-contact temperature sensor is provided at a side of the steering wheel with respect to the center portion of the dashboard in the vehicle lateral direction. Accordingly, it is compared with a case where the first non-contact temperature sensor is arranged at the side of the steering wheel than the center portion of the dashboard in the vehicle lateral direction, an area occupied by the steering wheel among the temperature detection area of the non-contact temperature sensor can be made smaller.

According to a further another aspect of the present invention, a control process of a computer for the vehicle air conditioner includes a determining step for determining whether the temperature detected by the non-contact temperature sensor is abnormal, and a notifying step for notifying a determination result in the determining step to a passenger in the passenger compartment. Preferably, in the determining step, it is determined whether or not the temperature detected by the non-contact temperature sensor is normal based on the signal from the environment condition detection means.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
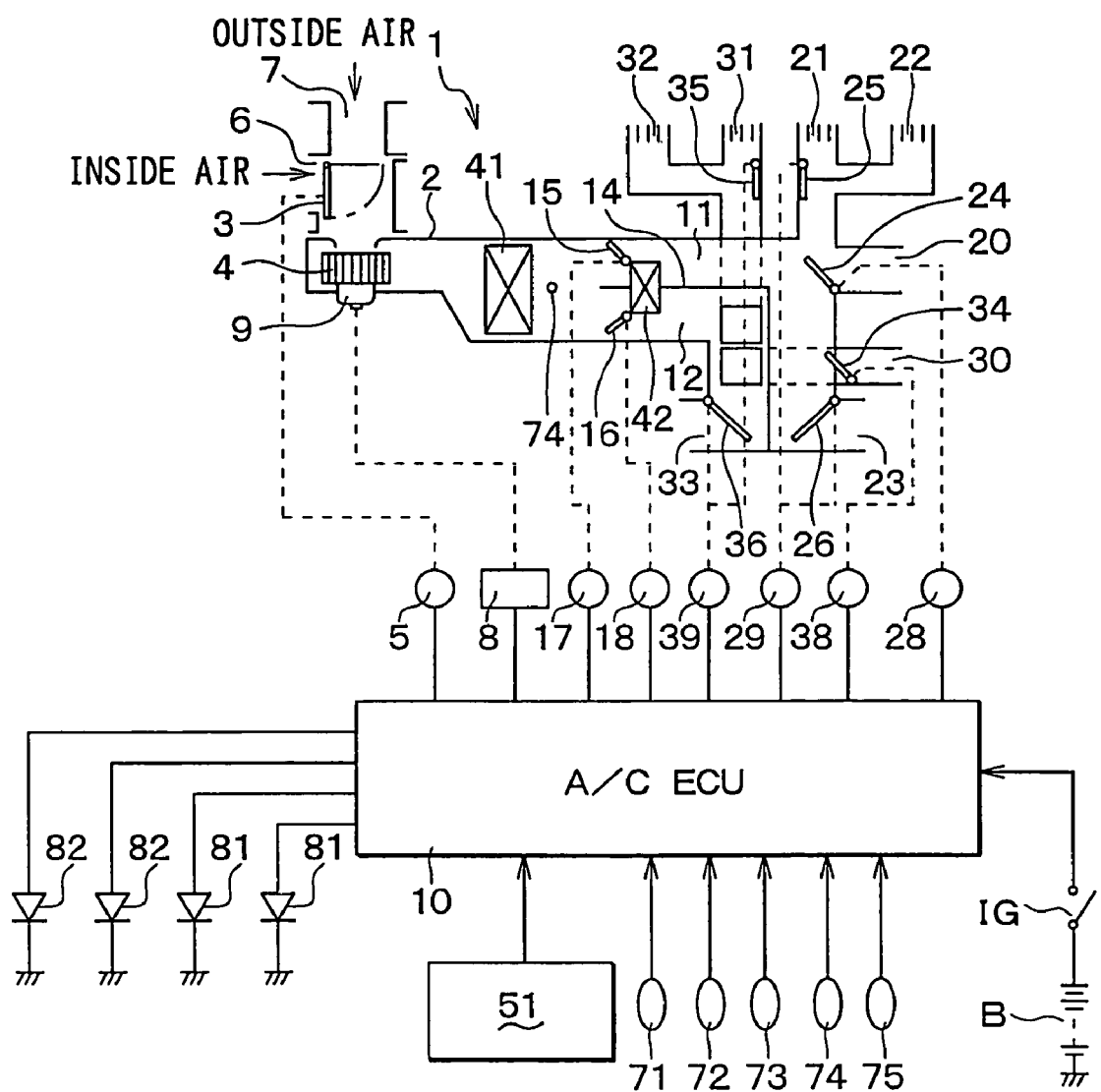
FIG. 1 is a schematic diagram showing an entire structure of a vehicle air conditioner according to a first embodiment of the present invention.

The first embodiment of the present invention will be now described with reference to FIGS. 1-9.

A vehicle air conditioner is for performing air-conditioning of a passenger compartment of the vehicle mounted with a driving engine. The vehicle air conditioner is constructed of an air-conditioning unit 1 and an air conditioning ECU 10 for controlling various kinds of electrically operated actuators of this air conditioning unit 1. The air-conditioning unit 1 adjusts a temperature in a driver's seat-side air-conditioning zone and a temperature in a passenger's seat-side air-conditioning zone in the passenger compartment, and changes an air outlet mode independently from each other. In the vehicle having a right steering wheel, the driver's seat-side air-conditioning zone includes a front right seat side and a rear right seat side of the passenger compartment, and the passenger's seat-side air-conditioning zone includes a front left seat side and a rear left seat side of the passenger compartment.

To be specific, the air-conditioning unit 1 is provided with an air conditioning duct 2 arranged on the front side in the passenger compartment of the vehicle. An inside/outside air switching door 3 and a blower 4 are provided on an upstream side of this air conditioning duct 2. The inside/outside air switching door 3 is driven by an electrically operated actuator such as a servomotor 5 to change an opening degree of an inside air introduction port 6 and an opening degree of an outside air introduction port 7.

The blower 4 is a centrifugal blower which is rotated by a blower motor 9 to produce a flow of air going into the passenger compartment in the air conditioning duct 2. The blower motor 9 is controlled by a blower drive circuit 8.

In the air conditioning duct 2, an evaporator (i.e., cooling heat exchanger) 41 for cooling air passing through the air conditioning duct 2 is disposed. On a downstream side of the evaporator 41 in an air flow direction, a heater core (i.e., heating heat exchanger). 42 is disposed for heating air. In the heater core 42, air passing through the first and second air passages 11, 12 exchanges heat with engine-cooling water (hot water) to be heated.

The first and second air passages 11, 12 are partitioned by a partitioning plate 14 in the air conditioning duct 2. When the air conditioner is used for a vehicle that is driven by an electric power, the evaporator may be replaced by a Peltier device.

On the other hand, on an upstream air side of the heater core 42, driver's seat-side and passenger's seat-side air mixing (A/M) doors 15, 16 are disposed, for determining a ratio between air flowing into the heater core 42 and air bypassing the heater core 42 for each air passage. 11, 12

The driver's seat-side and passenger's seat-side A/M doors 15, 16 are driven by actuators such as servomotors 17, 18, respectively, so that the temperature of the conditioned air blown from the driver's seat-side air outlets toward the driver's seat-side air-conditioning zone and the temperature of the conditioned air blown from the passenger's seat-side air outlets toward the passenger's seat-side air-conditioning zone can be respectively independently controlled. More particularly, the temperature of conditioned air blown toward inside surfaces of driver's seat-side and passenger's seat-side front windshields can be independently controlled.

The evaporator 41 is one constituent part of a refrigeration cycle. The refrigeration cycle is constructed of a compressor that is driven by the driving engine via an electromagnetic clutch to compress and discharge refrigerant, a condenser that condenses and liquefies the refrigerant discharged from the compressor, a receiver that separates the refrigerant condensed and liquefied by the condenser into gas refrigerant and liquid refrigerant, an expansion valve that adiabatically expands the liquid refrigerant flowing from the receiver, and the evaporator 41 that evaporates and vaporizes the gas-liquid two-phase refrigerant flowing from the expansion valve.

A rotational force from the driving engine is intermittently transmitted to the compressor by the electromagnetic clutch that is controlled by the air conditioning ECU 10. When the electromagnetic clutch is turned on to start an electrically operated compressor 410, the compressor 410 discharges the compressed refrigerant from its discharge port to the condenser. When the electromagnetic clutch is turned off to stop the compressor, the electrically operated compressor 410 stops discharging the refrigerant to the condenser. In this manner, by increasing or decreasing the amount of circulation of the refrigerant circulating in the refrigerant cycle, that is, the amount of the refrigerant flowing into the evaporator 41, a cooling capacity of the evaporator 41 can be controlled.

As shown in FIG. 1, a driver's seat-side defroster (DEF) air outlet 20, a driver's seat-side center face (FACE) air outlet 21, a driver's seat-side side face (FACE) air outlet 22, and a driver's seat-side foot (FOOT) air outlet 23 are opened at downstream ends of air outlet ducts communicating with a downstream side of the first air passage 11.

A passenger's seat-side defroster (DEF) air outlet 30, a passenger's seat-side center face (FACE) air outlet 31, a passenger's seat-side side face (FACE) air outlet 32, and a passenger's seat-side foot (FOOT) air outlet 33 are opened at downstream ends of air outlet ducts communicating with the downstream side of the second air passage 12.

The driver's seat-side and passenger's seat-side DEF air outlets 20, 30 construct air outlets for blowing off the conditioned air (mainly, warm air) toward the front windshield. The driver's seat-side and passenger's seat-side FACE air outlets 22, 32 construct air outlets for blowing off the conditioned air (mainly, warm air) toward the side widow.

In the first and second air passages 11, 12, the driver's seat-side and passenger's seat-side air outlet switching doors 24 to 26 and 34 to 36 are provided. The driver's seat-side and passenger's seat-side air outlet switching doors 24 to 26 and 34 to 36 are mode switching doors that are operated by actuators such as servomotors 28, 29, 38, 39 to switch driver's seat-side and passenger's seat-side air outlet modes, respectively. The driver's seat-side and passenger's seat-side air outlet modes include a FACE mode, a B/L mode, a FOOT mode, and a DEF mode.

The air conditioning ECU 10 performs air-conditioning operation, as described later. For example, the air conditioning ECU 10 controls an air state in the passenger compartment and informs the passenger of a detection state of a temperature detected by non-contact temperature sensors 71, 72 on the basis of switch signals outputted from various operating switches on an air-conditioning operating panel 51 and various kinds of sensors to be described later such as the non-contact temperature sensors 71, 72.

Figure 2:
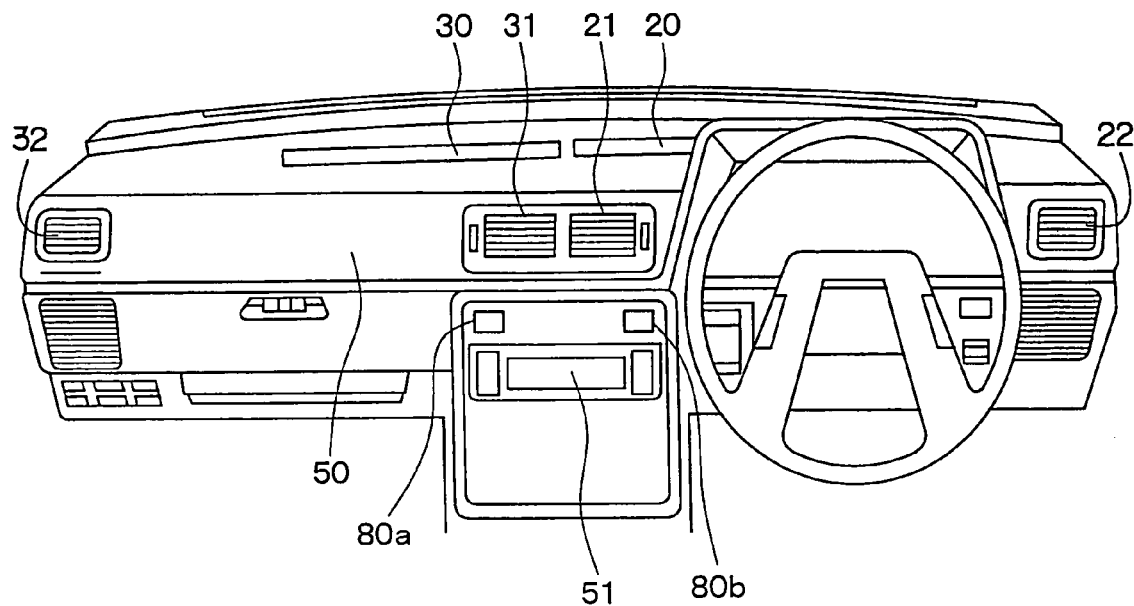
FIG. 2 is a front view showing an air-conditioning operation panel of a dashboard according to the first embodiment.
Figure 4:
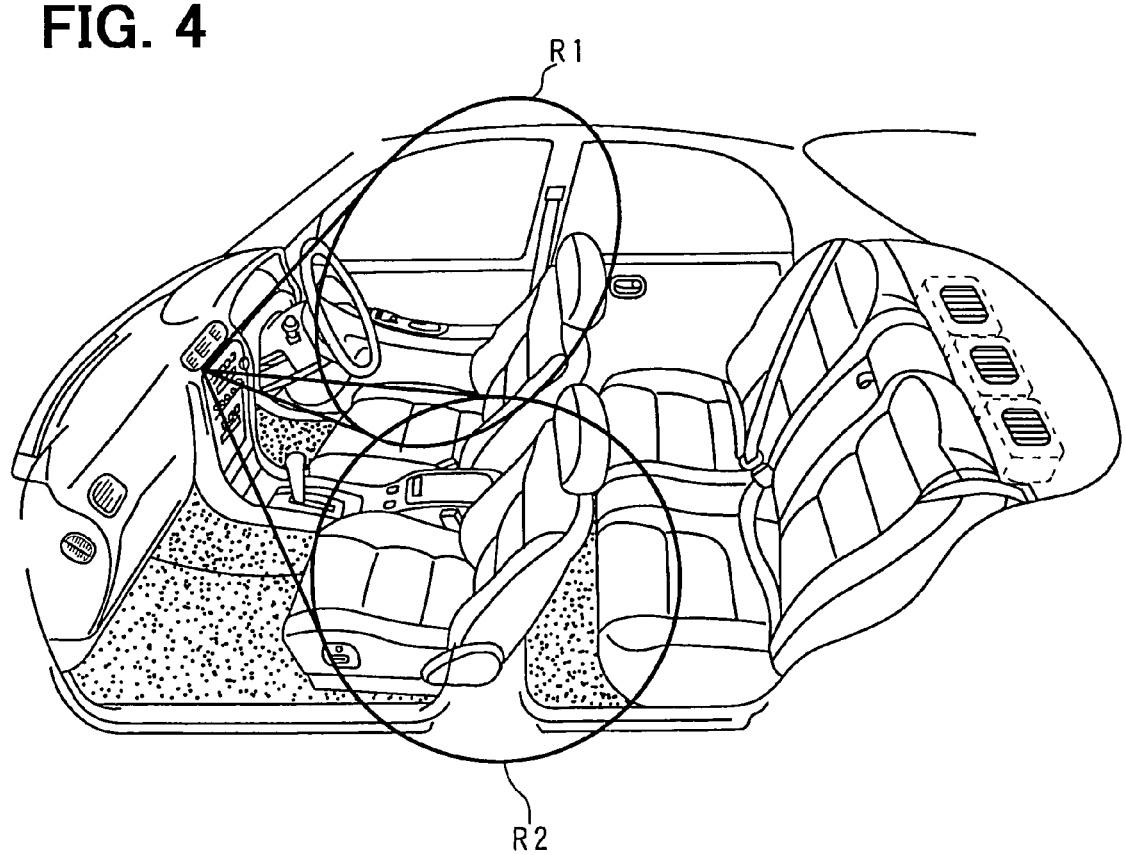
FIG. 4 is a perspective view showing detection areas of the non-contact temperature sensors in a passenger compartment, according to the first embodiment.
Figure 3:
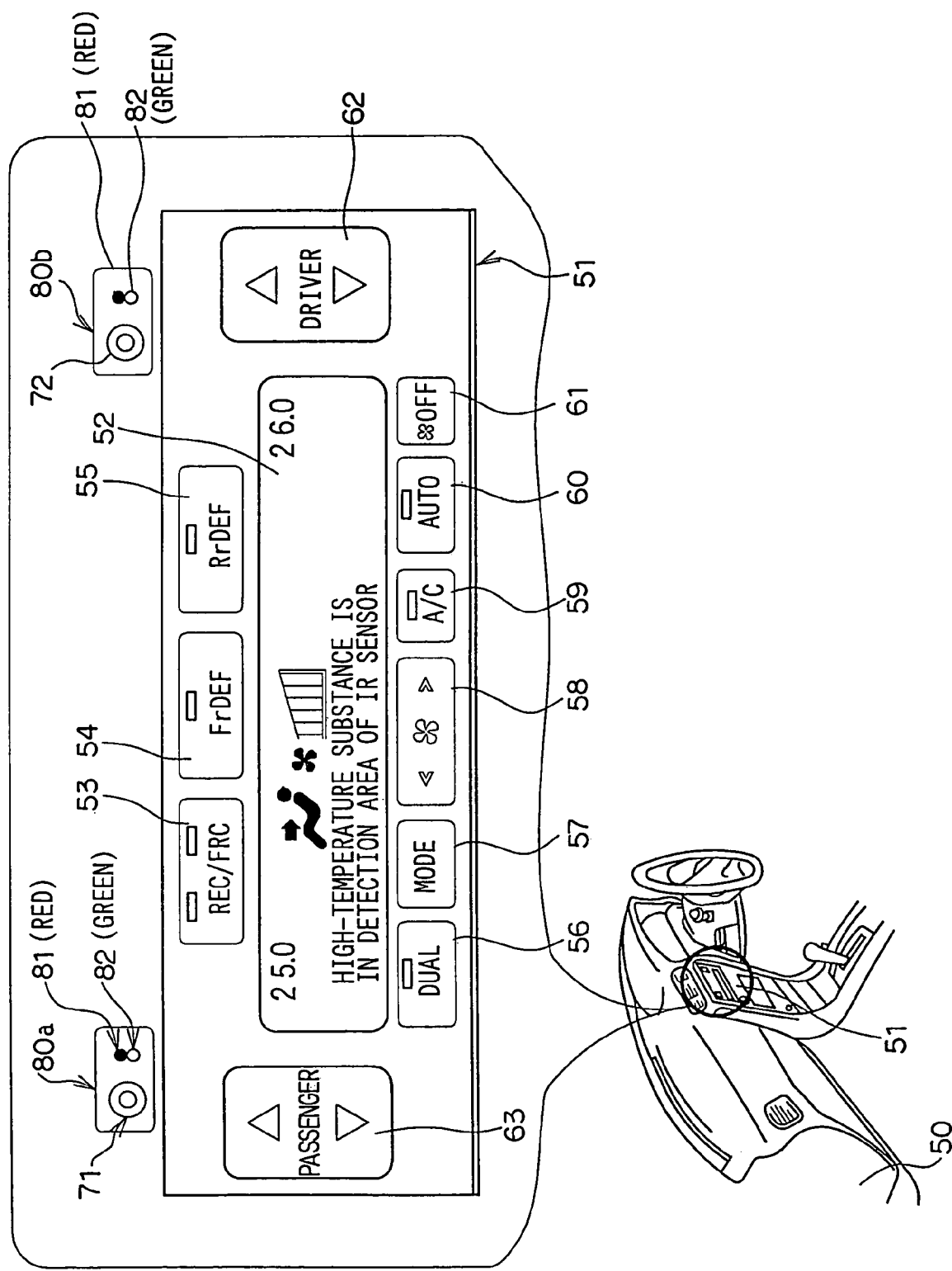
FIG. 3 is a partially enlarged view showing arrangement positions of non-contact temperature sensors according to the first embodiment.

The air-conditioning operating panel 51, as shown in FIG. 2 and FIG. 3, is placed in a center area in a vehicle lateral direction of a dashboard 50. The air-conditioning operating panel 51 is provided with a liquid crystal display device 52, an inside/outside air switching switch 53, a front defroster switch 54, a rear defroster switch 55, a DUAL switch 56, a mode switching switch 57, a blower air amount switching switch 58, an A/C switch 59, an AUTO switch 60, an OFF switch 61, a driver's seat-side temperature setting switch 62, a passenger's seat-side temperature setting switch 63 and the like.

The driver's seat-side temperature setting switch 62 sets a temperature in the driver's seat-side air-conditioning zone at a desired temperature. The passenger's seat-side temperature setting switch 63 sets a temperature in the passenger's seat-side air-conditioning zone at a desired temperature. The liquid crystal display device 52 displays the temperature set by the temperature setting switches 62, 63.

As shown in FIG. 1, sensors such as the driver's seat-side non-contact temperature sensor 71, the passenger's seat-side non-contact temperature sensor 72, an outside air temperature sensor 73, a post-evaporator air temperature sensor 74 and a water temperature sensor 75 are connected to the air-conditioning ECU 10. The driver's seat-side non-contact temperature sensor 71 is disposed for detecting the temperature in the driver's seat-side air-conditioning zone in the passenger compartment, the passenger's seat-side non-contact temperature sensor 72 is disposed for detecting the temperature in the passenger's seat-side air-conditioning zone in the passenger compartment, the outside air temperature sensor 73 is disposed for detecting the temperature of outside air outside the passenger compartment, the post-evaporator air temperature sensor 74 is disposed for detecting a temperature of air blown off from the evaporator 41, and the water temperature sensor 75 is disposed for detecting the temperature of the engine-cooling water of the vehicle.

The non-contact temperature sensor 71, as shown in FIG. 3, is placed near light emitting diodes 81, 82. The non-contact temperature sensor 71 and the light emitting diodes 81, 82 construct a sensor unit 80a. The sensor unit 80a is arranged in a center area of the dashboard 50 and is located near and on a left upper side of the air-conditioning operating panel 51, as shown in FIG. 3.

The non-contact temperature sensor 72, as shown in FIG. 3, is placed near light emitting diodes 81, 82. The non-contact temperature sensor 72 and the light emitting diodes 81, 82 construct a sensor unit 80b. The sensor unit 80b is arranged in the center area of the dashboard 50 and is located near and on a right upper side of the air-conditioning operating panel 51.

The non-contact temperature sensor 71 detects a temperature of a detection area R1 (see FIG. 4) including the surface of the driver's seat in a non-contact manner. The non-contact temperature sensor 71 is constructed of a sensor element that is arranged so that its light receiving surface is directed toward the detection area R1. This sensor element outputs an electric signal responsive to the amount of infrared light entering from the detection area R1.

The non-contact temperature sensor 72 detects a temperature of a detection area R2 (see FIG. 4) including the surface of the passenger's seat in a non-contact manner. The non-contact temperature sensor 72 is constructed of a sensor element that is arranged so that its light receiving surface is directed toward the detection area R2. This sensor element outputs an electric signal responsive to the amount of infrared light entering from the detection area R2.

The sensor element of each of the non-contact temperature sensors 71, 72 includes a temperature sensor element (not shown) for detecting an absolute temperature of the sensor itself and constructs an IR sensor of a thermopile type. A thermo-sensitive device such as a thermistor is used for the outside air temperature sensor 73, the post-evaporator air temperature sensor 74 and the water temperature sensor 75. The light emitting diodes 81, 82 are controlled by the air conditioning ECU 10 and emit red light and green light, respectively.

Next, operation of the first embodiment will be described with reference to FIG. 5. The air conditioning ECU 10 executes computer programs stored in a memory according to the flow chart shown in FIG. 5. The computer programs are executed at predetermined intervals (0.25 ms) after an ignition switch IG is turned on.

First, the surface temperature in the detection area R1 detected by the non-contact temperature sensor 71 is sampled (S100). Here, the sampled temperature will be referred to as TIRDr(n)NOW ("n" denotes the number of samplings). A reference symbol "i" in FIG. 5 denotes one of Dr (driver's seat-side) and Pa (passenger's seat-side). For example, "i" is DR (driver's seat side). A reference symbol TIR16Dr denotes an average value of TIRDr(n), TIRDr(n−1), TIRDr(n−2), . . . , and TIRDr(n−15) in a case where the surface temperature is sampled 16times on the driver's seat side.

Figure 5:
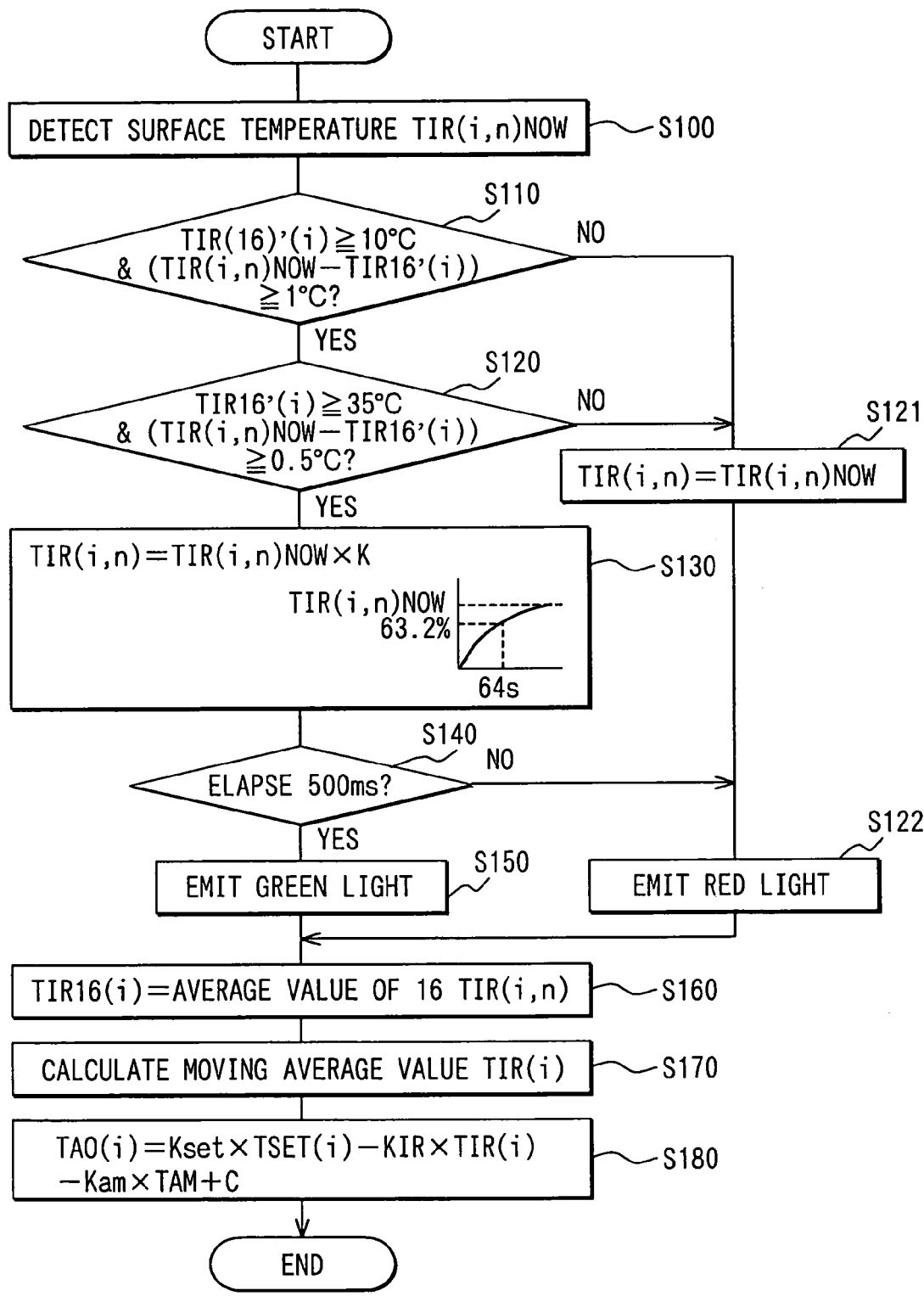
FIG. 5 is a flow diagram showing an air conditioning control operation of an air conditioning ECU, according to the first embodiment.

For example, in a case where the non-contact temperature sensor 71 detects the surface temperature of the driver's seat and the clothes of the driver, when an average value TIR16Dr just before detection (TIR16'(i) in FIG. 5) is 10° C. or more and a difference between the average value TIR16Dr just before detection (TIR16'(i) in FIG. 5) and TIRDr(n)NOW is 1° C. or more, a determination result at step S110 is YES. Here, the TIR16Dr just before detection (TIR16'(i) in FIG. 5) means an average value TIR16Dr calculated at the time of executing the computer program last time (that is, 0.25 ms before).

In a case where the non-contact temperature sensor 71 detects the surface of the driver's seat and the clothes of the driver, when the average value TIR16Dr just before detection (TIR16'(i) in FIG. 5) is 35° C. or more and the difference between the average value TIR16Dr just before detection and the TIRDr(n)NOW is 0.5° C. or more, a determination result at step S120 is YES.

By performing the determinations at steps S110 and S120, it is determined whether the detection temperature (that is, state of detection) of the non-contact temperature sensor 71 is normal. Thus, when the determination result at step S120 is YES, a temperature TIRDr detected by the non-contact temperature sensor 71 at a time before 64 seconds is multiplied by a coefficient k (=0.632) to find temperature data TIRDr(n) (=TIRDr(n)NOW×k) (S130). In this manner, even if the temperature in the detection area R1 detected by the non-contact temperature sensor 71 is changed rapidly, it is possible to obtain temperature data suppressing the rapid change in temperature.

Next, it is determined whether or not a predetermined time period (0.5 second) elapses after the computer program is executed (S140). When the predetermined time period does not elapse after the computer program is executed, the determination result at step S140 is NO and the control program proceeds to step S122. When the predetermined time period elapses after the computer program is executed, the determination result at step S140 is YES and the light emitting diode 82 is lit to emit the green light 82 (S150). This informs the driver that the temperature detected by the non-contact temperature sensor 71 is normal.

Figure 6:
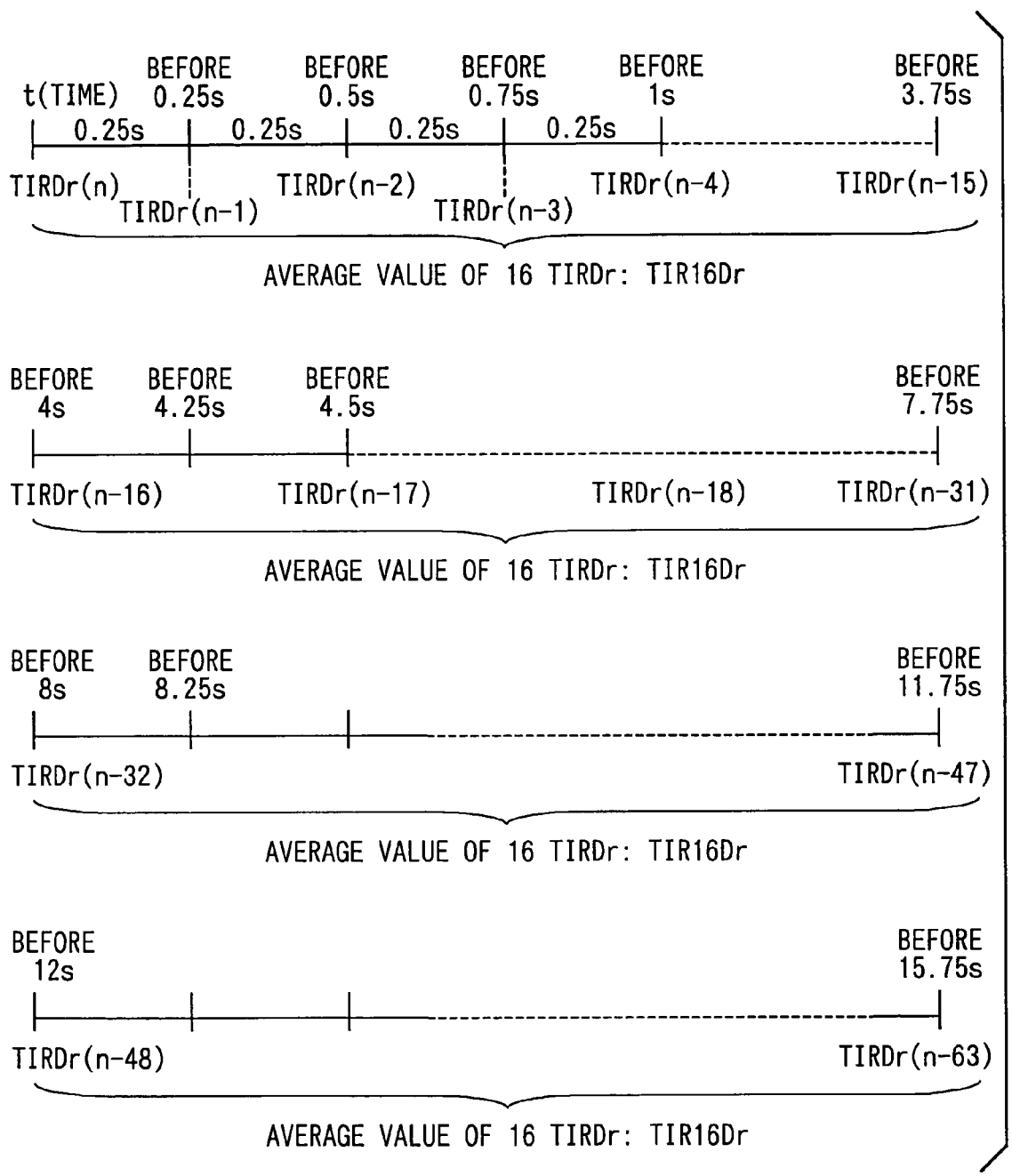
FIG. 6 is a schematic diagram for explaining an average value TIR16Dr of detected temperatures of non-contact temperature sensor (IR sensor), according to the first embodiment.

Next, TIRDr(n−1), TIRDr(n−2), . . . , TIRDr(n−15) are calculated, in the same way as TIRDr(n), with respect to 15 temperatures of TIRDr(n−1)NOW, TIRDr(n−2)NOW, . . . , TIRDr(n−15)NOW which were detected at intervals of 0.25 second in the past. Further, as shown in FIG. 6, TIR16Dr, which is an average value of the TIRDr(n−1), the TIRDr (n−2), . . . , the TIRDr(n−15) and the TIRDr(n), is calculated.

Next, a moving average value TIRDr of four average values TIR16Dr is obtained (S170). To be specific, as shown in FIG. 6, TIRDr(n−16) to TIRDr(n−31) are calculated, just as with TIRDr(n), with respect to TIRDr(n−16))NOW to TIRDr(n−31))NOW which were detected in the past. An average value TIR16Dra of these TIRDr(n−16)) to TIRDr (n−31)) is calculated.

Further, TIRDr(n−32)) to TIRDr(n−47)) are calculated, just as with TIRDr(n), with respect to TIRDr(n−32))NOW to TIRDr(n−47)NOW which were detected in the past. An average value TIR16Drb of these TIRDr(n−32)) to TIRDr (n−47)) is calculated.

Still further, TIRDr(n−48)) to TIRDr(n−63)) are calculated, just as with TIRDr(n), with respect to TIRDr(n−48)) NOW to TIRDr(n−63))NOW which were detected in the past. An average value TIR16Drc of these TIRDr(n−48)) to TIRDr(n−63)) is calculated.

In addition to this, the average value TIR(i) (e.g., TIRDr in this example) of the TIR16Dr, the TIR16Dra, the TIR16Drb, and the TIR16Drc is calculated. Moreover, at step S180, a target air temperature TAO(i) (i.e., TAODr in this example) of the driver seat is calculated by using the TIRDr.

To be specific, the temperature TIRDr calculated at step S170, a set temperature TSETDr set by the temperature setting switch 62, the temperature TAM outside the passenger compartment detected by the outside air temperature sensor 73 are substituted into the following equation 1 to calculate the target air temperature TAODr.

$$TAODr=Kset \times TSETDr-KIR \times TIRDr-Kam \times TAM+C \quad \text{[Equation 1]}$$

wherein, Kset, KIR, Kam are coefficients, and C is a constant value. For example, Kset is 7.0, KIR is 5.1, Kam is 1.0, and C is −45.

Further, in a case where the non-contact temperature sensor 71 detects, for example, the surface of cooled canned coffee, at step S110, it is determined that the last TIRDr16Dr is 10° C. or more and that the difference between the last TIR16Dr and the TIRDr(n)NOW is less than 1° C., and hence a determination result at step S110 is NO.

Still further, in a case where the non-contact temperature sensor 71 detects, for example, the surface of lighted tobacco, at step S120, it is determined that the last TIR16Dr is 35° C. or more and that the difference between the last TIR16Dr and the TIRDr(n)NOW is less than 0.5° C. and hence a determination result at step S120 is NO.

As described above, when a determination result at step S120 or step S110 is NO, it is determined that the temperature detected by the non-contact temperature sensor 71 is abnormal and the temperature TIRDr(n)NOW detected by the non-contact temperature sensor 71 is set to TIRDr(n) (S121).

In addition to this, the light emitting diode 81 of the sensor unit 80b is lit to emit red light (S122). Here, when the determination result at step S120 is NO, character information with that "a high-temperature substance is in the detection region of the non-contact temperature sensor (IR sensor)" is displayed on the liquid crystal display device 52. This informs the driver that the temperature detected by the non-contact temperature sensor 71 is abnormal. Further, a processing (S160) of calculating the average value of TIRDr (n), a processing (S170) of calculating the moving average value TIRDr, and a processing (S180) of calculating the target air temperature are performed by the use of TIRDr (=TIRDr(n)NOW).

Further, it is also determined whether or not temperature detected by the passenger's seat-side non-contact temperature sensor 72 is abnormal, similarly to that in the driver's seat-side non-contact temperature sensor 71, and one of the light emitting diodes 81, 82 of the sensor unit 80a is lit to inform the passenger of the determination result. In addition to this, as in the case with the driver's seat-side non-contact temperature sensor 71, a passenger's seat-side target air temperature TAOPa can be calculated (S100 to S180).

A blower voltage VA to be applied to the blower motor 9 (in other words, the air blowing amount of the blower 4) is calculated on the basis of the driver's seat-side and passenger's seat-side target air temperatures TAODr, TAOPa obtained in the above manner.

Figure 7:
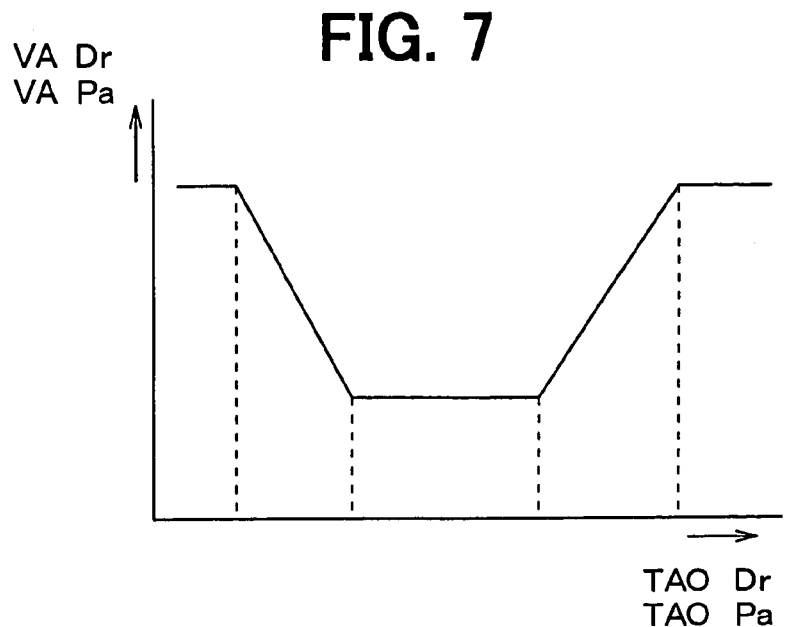
FIG. 7 is a characteristic graph for determining a blower voltage VADr, VAPa.

For example, blower voltages VADr, VAPa corresponding to the driver's seat-side and the passenger's seat-side target air temperatures TAODr, TAOPa are calculated on the basis of the characteristic graph in FIG. 7. Then, the blower voltage VA is calculated by calculating an average value of these blower voltages VADr, VAPa.

Figure 8:
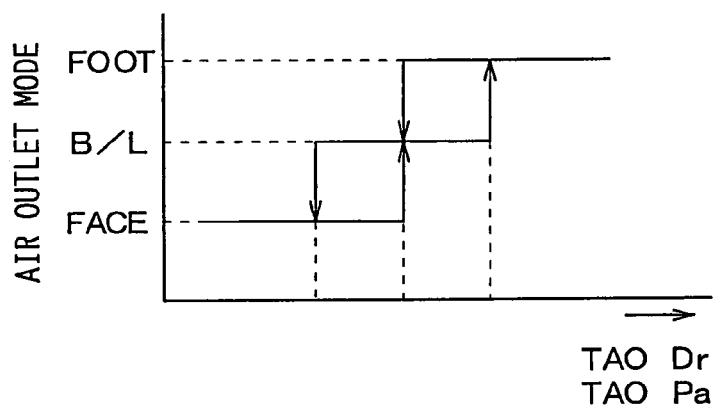
FIG. 8 is a characteristic graph for determining an air outlet mode.

A driver's seat-side air outlet mode and a passenger's seat-side air outlet mode are determined respectively on the basis of the driver's seat-side and the passenger's seat-side target air temperatures TAODr, TAOPa which are found in the above manner and a characteristic graph shown in FIG. 8.

When the face mode (FACE) is determined on the driver's seat-side, only the air outlets 21, 22 are opened. When the foot mode (FOOT) is determined on the driver's seat-side, only the air outlets 23 are opened. When the bi-level mode (B/L) is determined on the driver's seat-side, the air outlets 21 to 23 are opened. When the face mode is determined on the passenger's seat-side, only the air outlets 31, 32 are opened. When the foot mode is determined on the passenger's seat-side, only the air outlets 33 are opened. When the bi-level mode (B/L) is determined on the passenger's seat-side, the air outlets 31 to 33 are opened.

Figure 9:
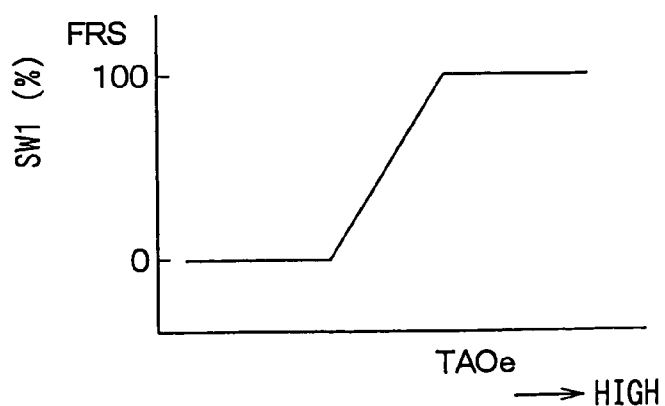
FIG. 9 is a characteristic graph for determining an opening degree SW1 of an inside/outside air door.

Next, an average value of the driver's seat-side and the passenger's seat-side target air temperatures TAODr, TAOPa which are found in the above manner is calculated. A target ratio between an amount of the inside air introduced through the inside air introduction port 6 and an amount of the outside air introduced through the outside air introduction port 7, that is, a target opening degree (target movement position) of the inside/outside air switching door 3 is determined by the use of the average value TAOe (i.e., TAOe= (TAODr+TAOPa)/2) of the target air temperatures TAODr, TAOPa and a characteristic graph shown in FIG. 9. In FIG. 9, when the SW1 is 0%, only inside air is introduced through the inside air introduction port 6. When the SW1 is 100%, only outside air is introduced through the outside air introduction port 7. As the SW1 increases, the outside air amount introduced through the outside air introduction port 7 is increased and the inside air amount introduced through the inside air introduction port 6 is reduced.

The driver's seat-side and the passenger's seat-side target air temperatures TAODr, TAOPa which are found in the above manner are substituted into the following equations 2, 3 to obtain the A/M opening degree SW(Dr) of the driver's seat-side A/M door 15 and the A/M opening degree SW(Pa) of the passenger's seat-side A/M door 16.

$$SW(Dr)=(TAODr-TE)\times 100/(TW-TE) \quad \text{(Equation 2)}$$

$$SW(Pa)=(TAOPa-TE)\times 100/(TW-TE) \quad \text{(Equation 3)}$$

where TE is a temperature detected by the post-evaporator air temperature sensor 74 and TW is a temperature detected by the water temperature sensor 75.

Next, the blower voltage VA obtained in the above manner is outputted to the drive circuit 21. Further, control signals showing the air outlet mode, the A/M opening degree SW(Dr), the A/M opening degree SW(Pa) and the target opening degree of the inside/outside air switching door 3 are outputted to the corresponding motors of the servomotors 5, 17, 18, 28, 29, 38, 39 and an electric motor 460. Thus, the respective servomotors and the electric motor 460 are operated.

Further, the air conditioning ECU 10 outputs a control signal for turning on or off the electromagnetic clutch to the electromagnetic clutch, so that the temperature TE detected by the post-evaporator air temperature sensor 74 becomes close to a predetermined level. Thus, the compressor is repeatedly started or stopped to control the cooling capacity of the evaporator 41 so that the cooling capacity of the evaporator 41 becomes a predetermined level.

With the control operation described above, the servomotors 5, 17, 18, 28, 29, 38, 39, the electric motor 460 and the compressor are operated, respectively, to control an air state in the passenger compartment.

Next, operation and effect of the vehicle air conditioner according to the first embodiment will be described.

(1) In the first embodiment, a vehicle air conditioner includes the non-contact temperature sensors 71, 72 for detecting the temperature in the driver's seat-side air-conditioning zone and the temperature in the passenger's seat-side air-conditioning zone in the passenger compartment, and the air-conditioning unit 1 that controls the air state in the passenger compartment on the basis of the temperatures detected by the non-contact temperature sensors 71, 72. The air conditioner determines whether or not the temperatures detected by the non-contact temperature sensors 71, 72 are abnormal and informs the passenger of the determination results by lighting the light emitting diodes 81, 82.

Thus, it is possible to notify the user whether or not the temperatures detected by the non-contact temperature sensors 71, 72 are normal. As a result, by removing substances interfering with the detection of temperature by the non-contact temperature sensors 71, 72, it is possible to perform a normal air-conditioning operation. Further, it is possible to notify the passenger that the air conditioner is normally operated and to provide the passenger with peace of mind.

(2) Each of the non-contact temperature sensors 71, 72 are arranged near the light emitting diodes 81, 82. Hence, the passenger can be easily notified which non-contact temperature sensor detects abnormal temperature.

(3) The character information informing that "a high-temperature substance is in the detection area of the non-contact temperature sensor (IR sensor)" is displayed by the use of the liquid crystal display device 52 for displaying the set temperature of the temperature setting switches 62, 63. That is, the determination result that the temperature detected by the non-contact temperature sensor 71 (72) is abnormal can be notified by the passenger by the use of the liquid crystal display device 52.

Thus, the passenger can be notified of the determination result that the temperature detected by the non-contact temperature sensor 71 (72) is abnormal, by display, without providing a new display part.

(4) Whether or not the temperature detected by the non-contact temperature sensor 71 (72) is normal is determined by the use of the last TIR16Dr (i.e., the TIR16(i) just before detection). That is, it is determined whether or not the temperature detected now by the non-contact temperature sensor 71 (72) is abnormal, on the basis of the temperature detected by the non-contact temperature sensor 71 (72) at a time before a predetermined time period. Thus, even if outside noises are inputted to the non-contact temperature sensor 71 (72) or passenger' hand comes into the region to be detected by the non-contact temperature sensor 71 (72) when the passenger usually operates the switches, it can prevent the detection temperature from being abnormal immediately after the occurrence of the events. Therefore, the air conditioner can be prevented from being controlled under abnormal conditions.

Second Embodiment

The second embodiment of the present invention will be now described with reference to FIGS. 10-13.

In the above-described first embodiment, the position of the sensor unit (non-contact temperature sensor) is fixed at one position. However, even if the cooled air of a refrigerator as an optional part is detected by the non-contact temperature sensor and the temperature detected by the non-contact temperature sensor is determined to be abnormal, in a case where the refrigerator cannot be displaced, the air conditioner cannot be operated under normal conditions.

Figure 10:
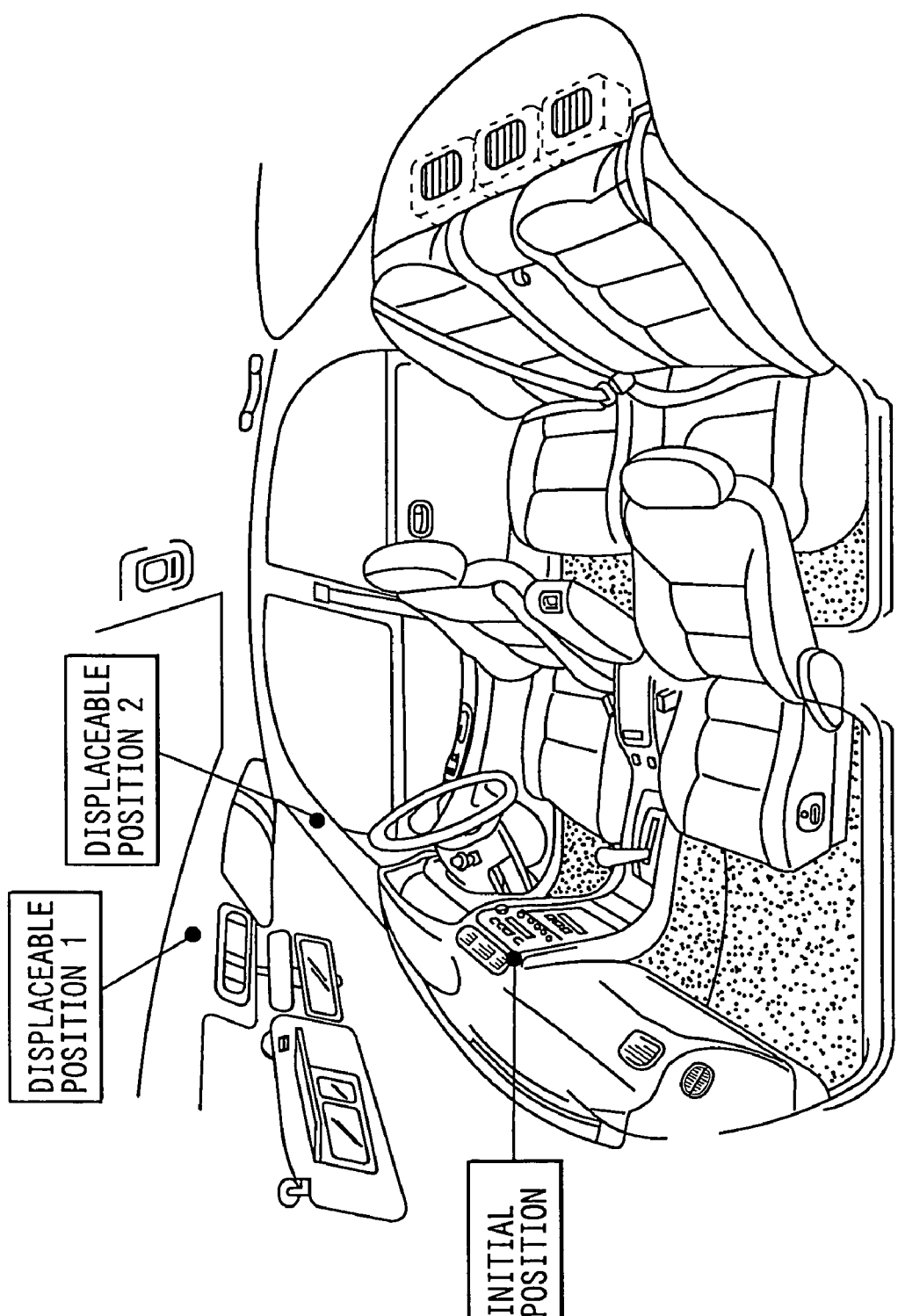
FIG. 10 is a schematic perspective view showing an initial position of a non-contact temperature sensor and displaceable positions 1 and 2 of the non-contact temperature sensor in the passenger compartment, according to a second preferred embodiment of the present invention.

In this second embodiment, the driver's-seat-side sensor unit 80b (non-contact temperature sensor 70), as shown in FIG. 10, can be displaced, in addition to the initial position, to either a displaceable position 1 (e.g., a central portion on the front side of a vehicle ceiling) or a displaceable position 2 (e.g., a surface of a pillar on the front side of the vehicle).

Figure 11:
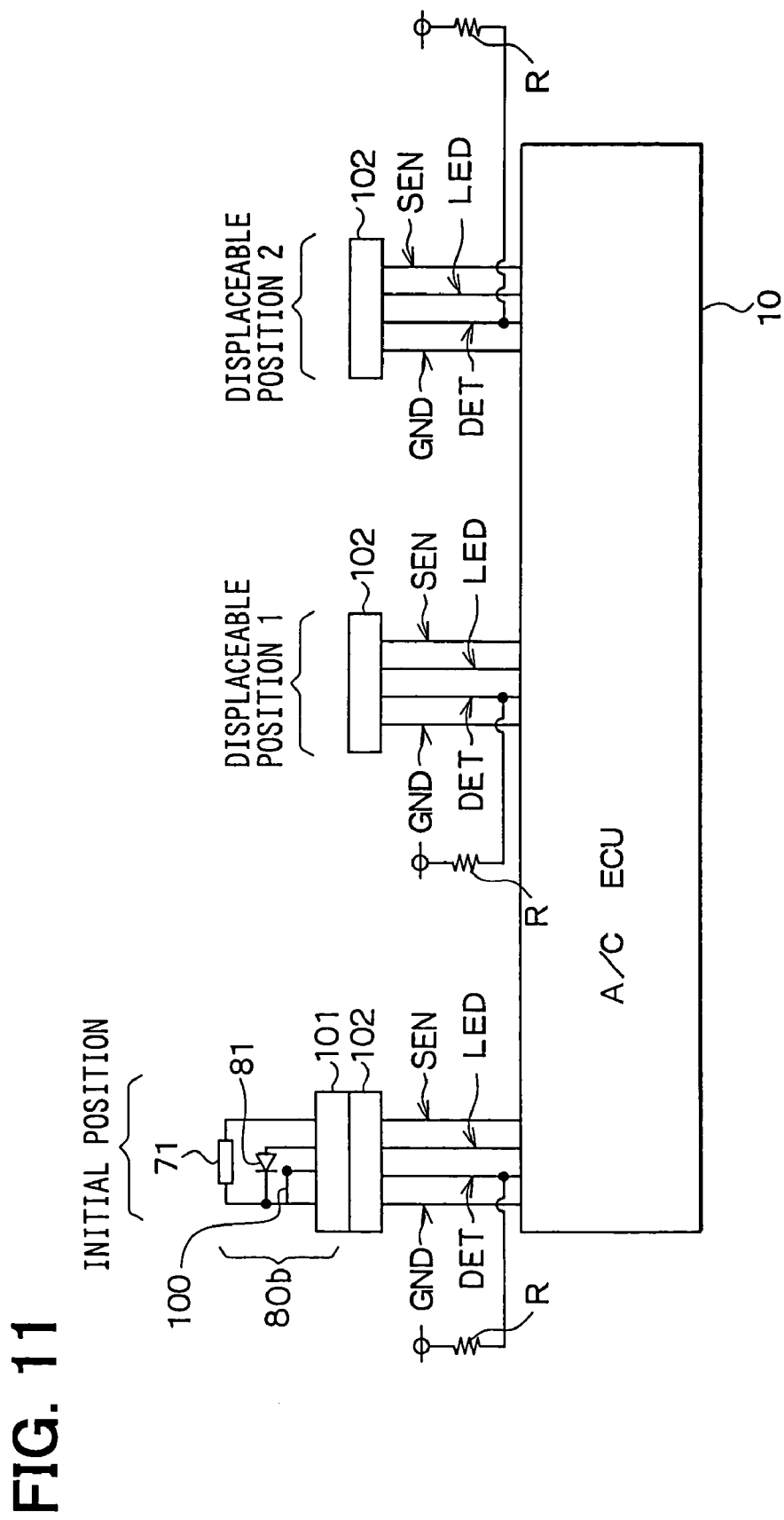
FIG. 11 is an electrical circuit structure connected to an air conditioning ECU, according to the second embodiment.

The sensor unit 80b, as shown in FIG. 11, is constructed of the light emitting diode 81, the non-contact temperature sensor 71, a lead wire 100, and a female connector 101. The light emitting diode 81, the non-contact temperature sensor 71 and the lead wire 100 are mounted on the obverse side of a substrate and the female connector 101 is mounted on the reverse side of the substrate.

Male connectors 102 to be fitted into the female connector 101 are arranged at the initial position and the displaceable positions 1, 2, respectively. A ground line (GND), a detection line (DET), a sensor input line (SEN), and an LED power supply line (LED) are connected to each of these male connectors 102 of the initial position, the displaceable position 1 and the displaceable position 2.

Here, the LED power supply line (LED) is a line for supplying the light emitting diode 81 with electric power from the air conditioning ECU 10. The sensor line (SEN) is a line for inputting an electric signal outputted from the non-contact temperature sensor 71 to the air conditioning ECU 10. Power source is connected to the detection line (DET) via a resistor element R and the detection line is used for the air conditioning ECU 10 to detect whether or not the male connector 102 is fitted into the female connector 101.

For example, when the male connector 102 is not fitted into the female connector 101, the detection line (DET) is supplied with electric power via the resistor element R from the power source, thereby being brought into a state where it is not in contact with the ground line (GND). Thus, the electric potential level of the detection line (DET) is brought into a high-level electric potential.

On the other hand, when the male connector 102 is fitted into the female connector 101, the detection line (DET) is electrically connected to the ground line (GND) via the female connector 101 and the male connector 102 through the lead line 100. For this reason, the detection line (DET) is supplied with the electric power via the resistor element R from the power source, but the electric potential level of the detection line is brought into a low-level electric potential.

Figure 12:
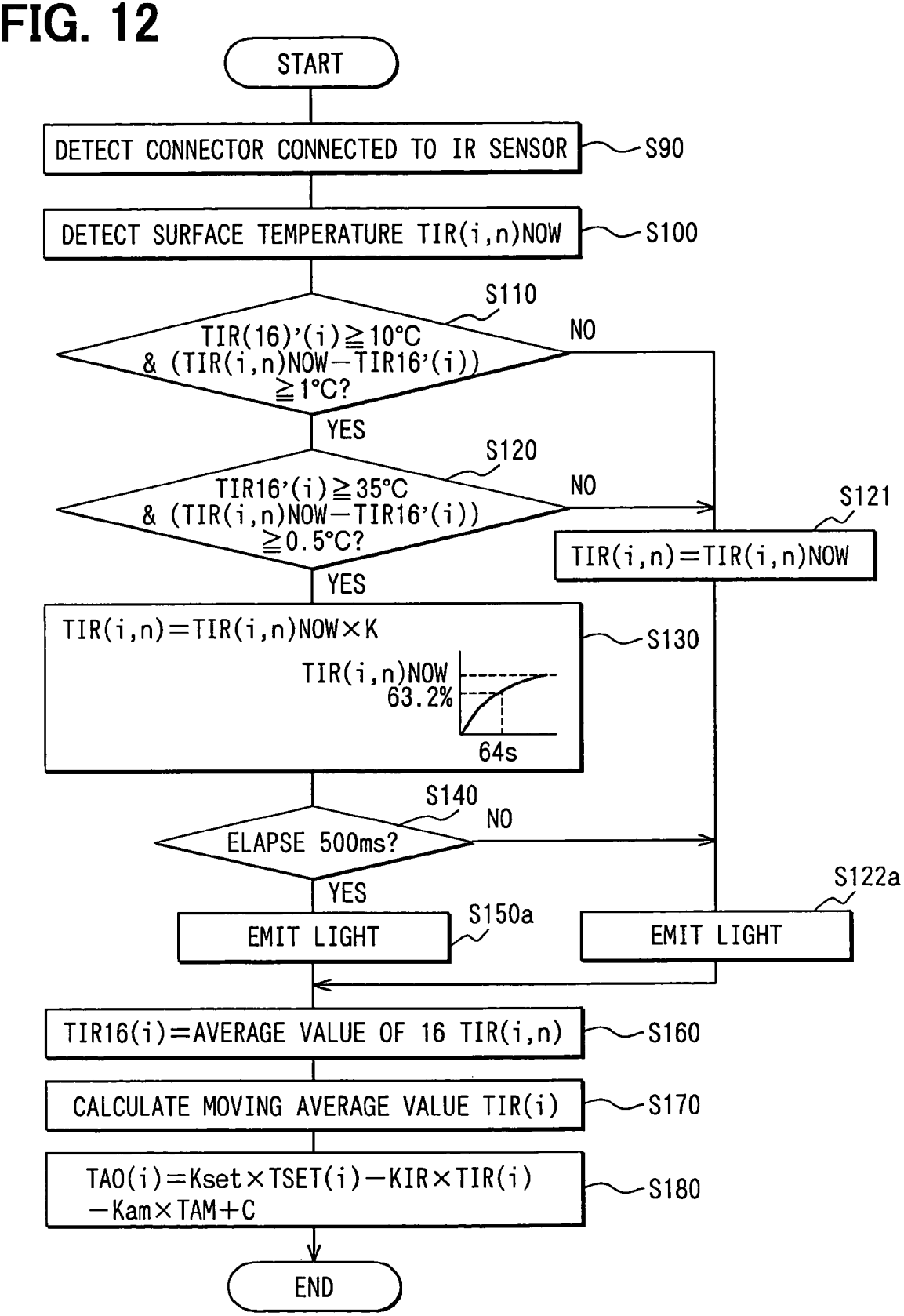
FIG. 12 is a flow diagram showing an air conditioning control of the air conditioning ECU, according to the second embodiment.

Next, the operation of the second embodiment will be described with reference to FIG. 12. The air conditioning ECU 10 executes computer programs stored in the memory according to a flow chart shown in FIG. 12 in place of the flow chart shown in FIG. 5.

First, among the male connectors 102 at the initial position, the displaceable position 1 and the displaceable position 2, the male connector 102 to which the sensor unit 80b (the non-contact temperature sensor 71) is connected is detected (S90).

In other words, it is detected which detection line of the initial position and the displaceable positions 1, 2 is at the low-level electric potential. For example, when the electric potential level of the detection line connected to the male connector 102 at the displaceable position 1 is the low-level electric potential, it is determined that the sensor unit 80b is connected to the displaceable position 1.

In this case, on the basis of the electric signal inputted through the sensor input line (SEN) connected to the male connector 102 at the displaceable position 1, it is determined whether or not the temperature detected by the non-contact temperature sensor 71 is abnormal (S100 to S120), similarly to that in the first embodiment. When it is determined that the detection temperature is normal, a pulse signal is inputted to the light emitting diode 81 through the LED power supply line connected to the male connector 102 at the displaceable position 1 (S150a). This can blink the light emitting diode 81. As a result, it is possible to notify the passenger that the temperature detected by the non-contact temperature sensor 71 is normal.

Figure 13:
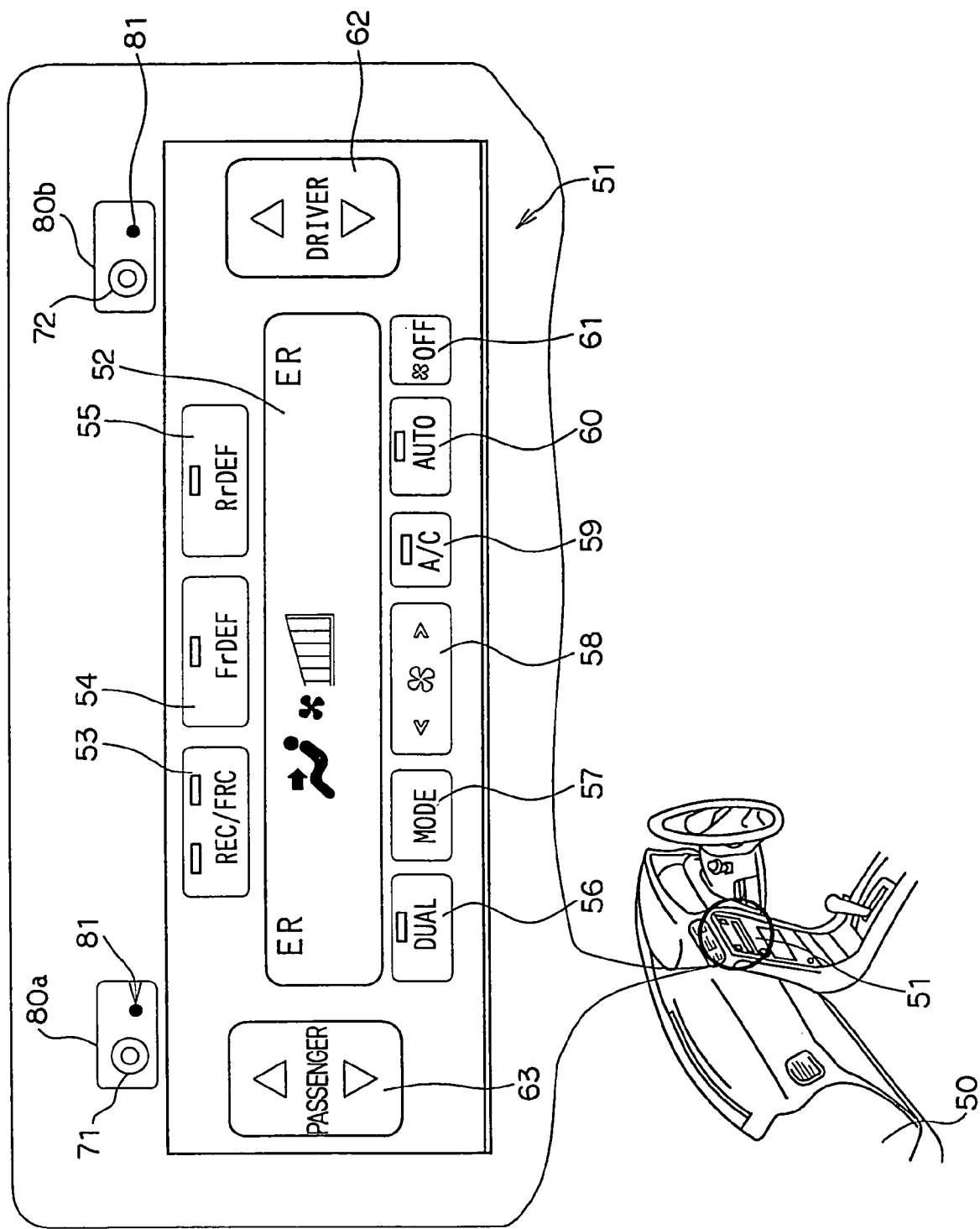
FIG. 13 is a partially enlarged view showing arrangement positions of non-contact temperature sensors according to the second embodiment.

When it is determined that the temperature detected by the non-contact temperature sensor 71 is abnormal, a signal of a predetermined level is inputted to the light emitting diode 81 through the LED power supply line (LED) connected to the male connector 102 at the displaceable position 1 to blink the light emitting diode 81 (S121, S122a). In addition to this, by displaying a letter "Er" on the liquid crystal display device 52 in place of the set temperature, it can notify the passenger that the temperature detected by the non-contact temperature sensor 71 is abnormal, as shown in FIG. 13. Here, in place of the letter "Er", a symbol "--" may be displayed on the liquid crystal display device 52.

Thereafter, as in the case with the first embodiment described above, the servomotors 5, 17, 18, 28, 29, 38, 39, the electric motor 460 and the compressor are controlled to control the air state in the passenger compartment (S160-S180).

According to the second embodiment, when the sensor unit 80b is placed at any one of the initial position, the displaceable position 1 and the displaceable position 2 and it is determined that the temperature detected by the non-contact temperature sensor 71 is abnormal, the sensor unit 80b can be displaced to a position where it is determined that the temperature detected by the non-contact temperature sensor 71 is normal.

Thus, when an optional part such as a refrigerator is provided in the passenger compartment, in a case where the optional part cannot be displaced from the detection area to be detected by the non-contact temperature sensor 71, it is possible to avoid the detected temperature from being determined to be abnormal and to operate the vehicle air conditioner under normal conditions. In the second embodiment, the other parts are similar to those of the above-described first embodiment.

Third Embodiment

The third embodiment of the present invention will be now described with reference to FIGS. 14-20.

In the first embodiment described above, in order to obtain TAODr (TAOPa), an example of detecting the outside air temperature by the use of the outside air temperature sensor 73 has been described. However, in this third embodiment, the outside air temperature is added to the temperature detected by the non-contact temperature sensor, and the target air temperature TAODr, TAOPa is calculated without using the outside air temperature sensor 73.

Figure 14:
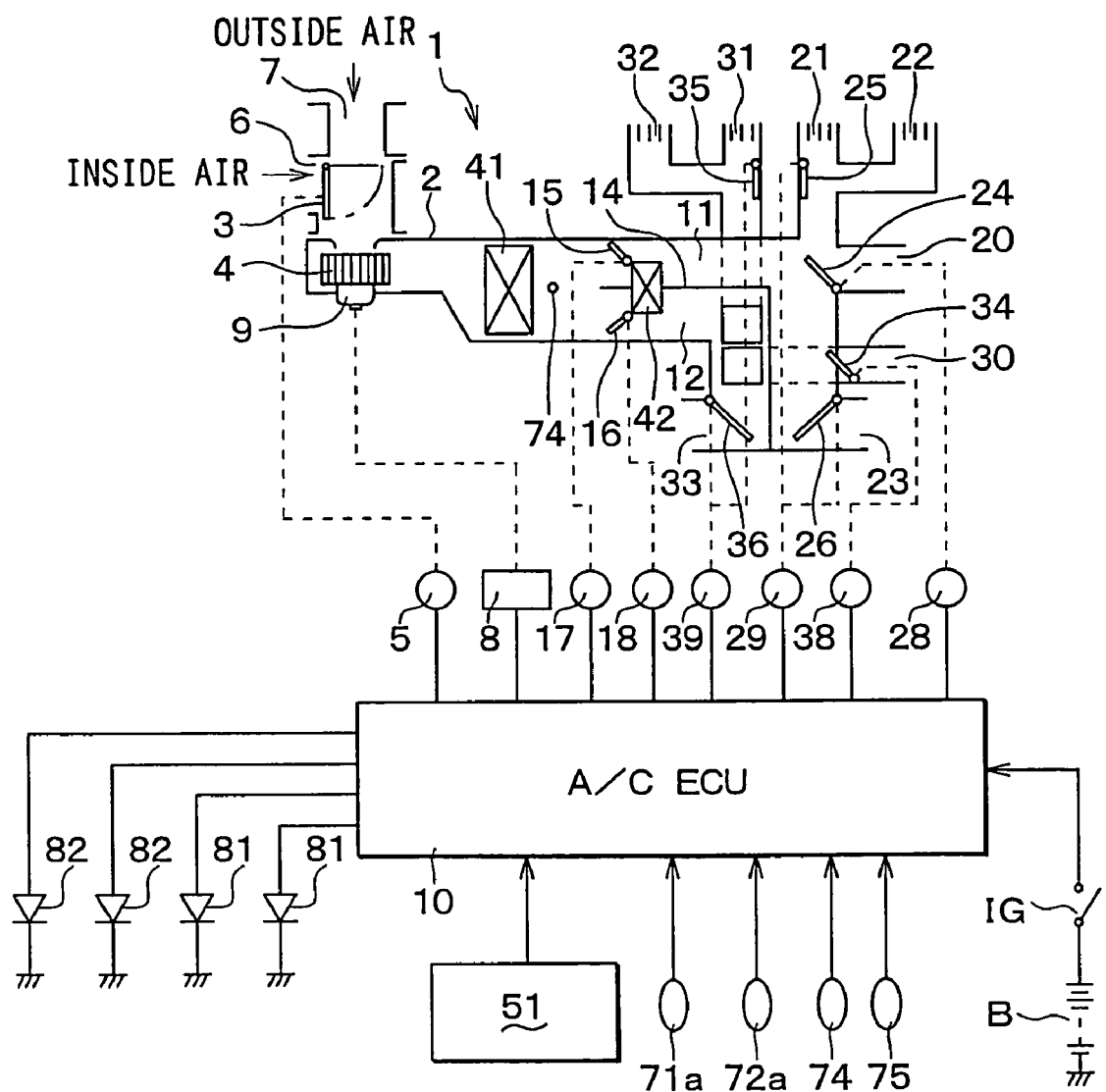
FIG. 14 is a schematic diagram showing an entire structure of a vehicle air conditioner according to a third embodiment of the present invention.

The construction of the vehicle air conditioner in the third embodiment is shown in FIG. 14. In FIG. 14, the non-contact temperature sensor 71a, 72a are the same as in the construction shown in FIG. 1. The non-contact temperature sensor 71a, 72a are employed in place of the non-contact temperature sensor 71, 72 shown in FIG. 1, respectively.

Figure 15:
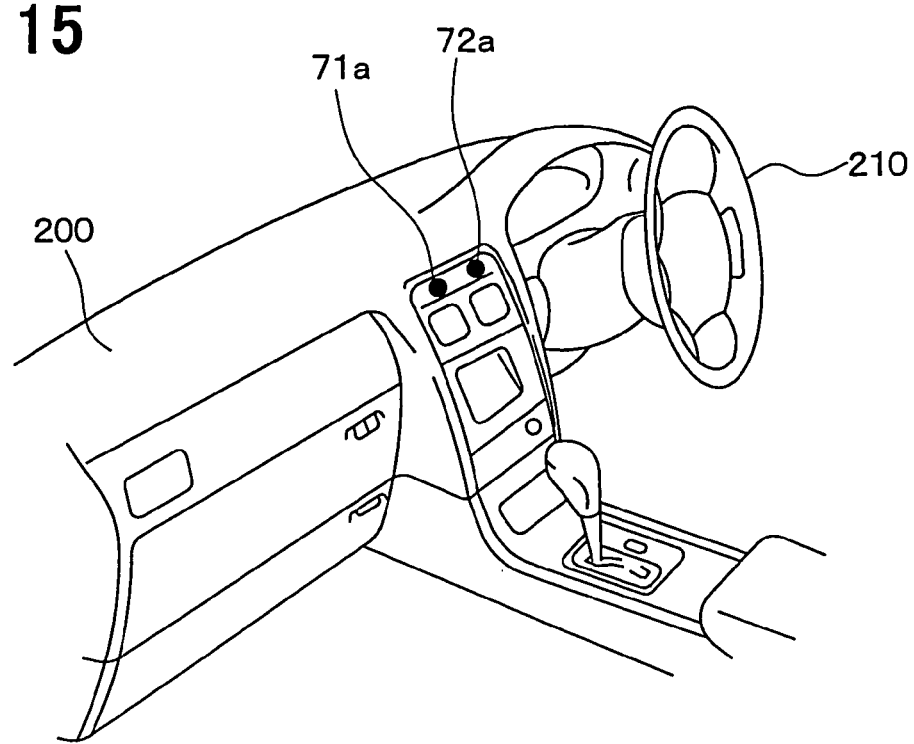
FIG. 15 is a perspective view showing arrangement positions of non-contact temperature sensors in a vehicle having a right steering wheel, according to the third embodiment.
Figure 17:
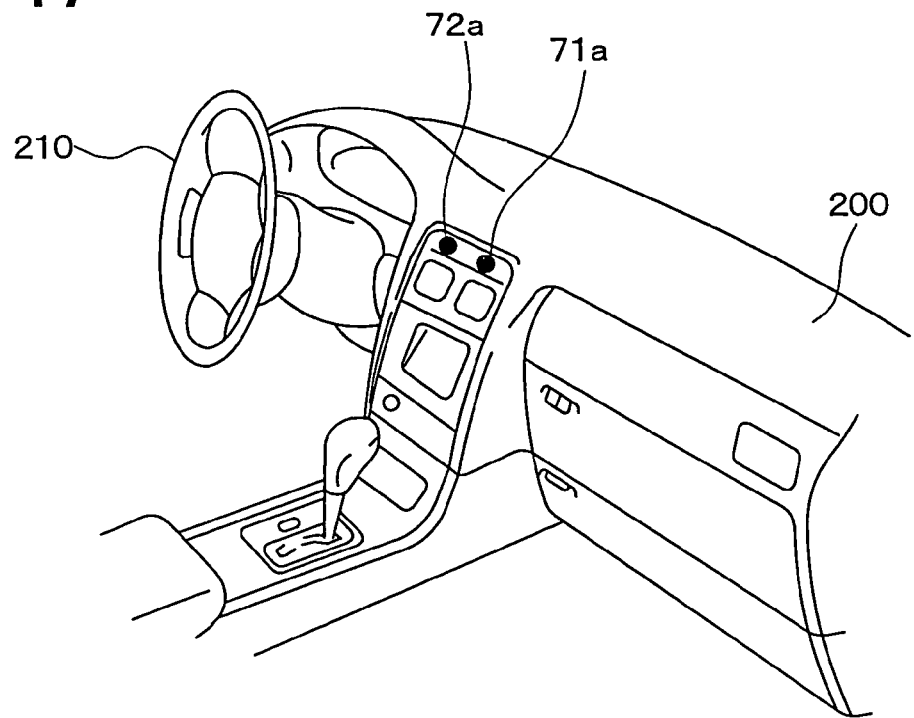
FIG. 17 is a perspective view showing arrangement positions of non-contact temperature sensors in a vehicle having a left steering wheel, according to the third embodiment.
Figure 16:
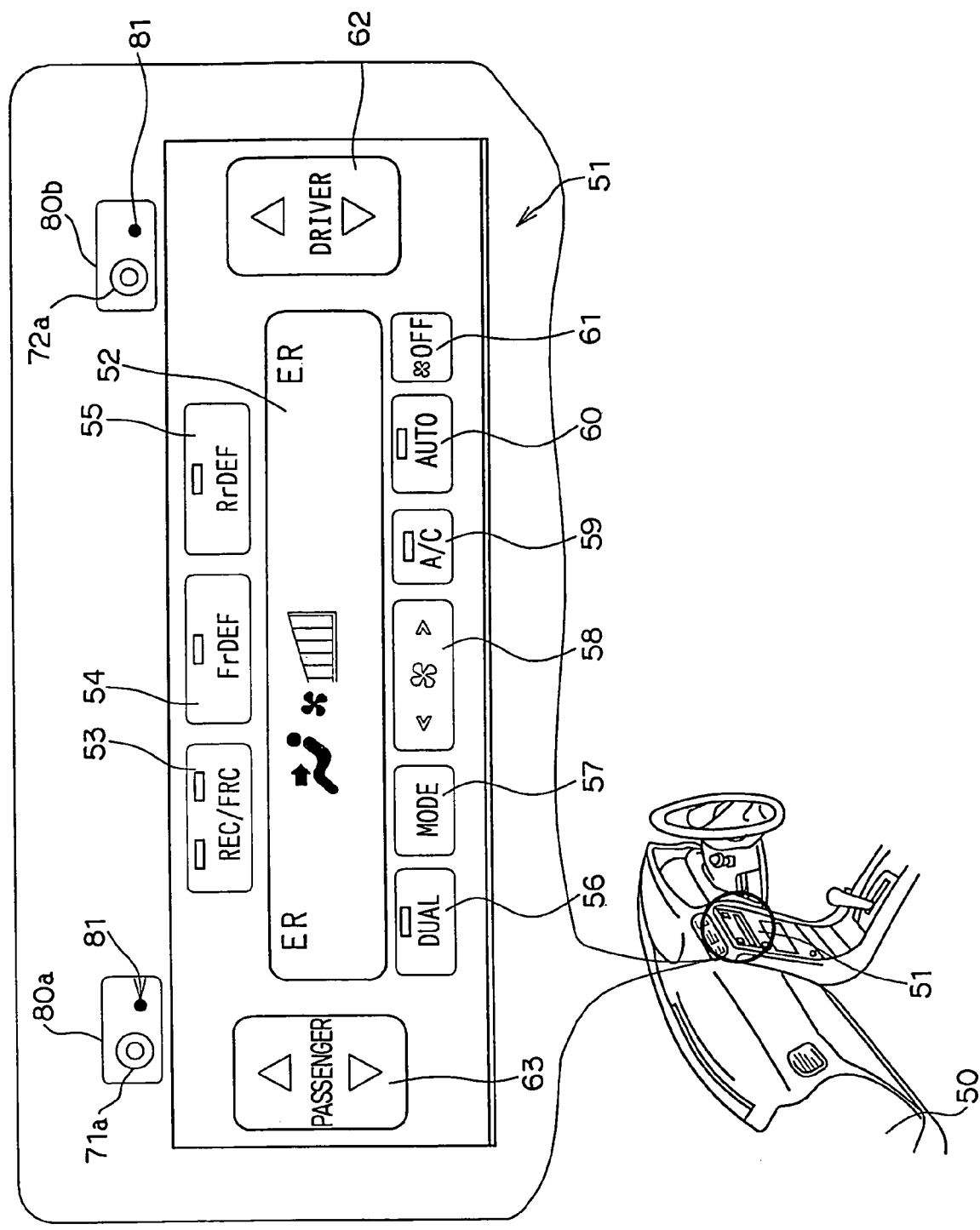
FIG. 16 is a partially enlarged view showing arrangement positions of the non-contact temperature sensors in FIG. 15.

The non-contact temperature sensor 71a is arranged in a dashboard 200 (i.e., instrument board) provided with instruments so as to face the driver's seat. The non-contact temperature sensor 71a, as shown in FIG. 15 to FIG. 17, is located nearer to a side opposite to a steering wheel 210 than the center position of the dashboard 200. The steering wheel 210 is operated by the driver so as to operate the steering angle of the vehicle.

FIG. 15 is a perspective view showing the passenger compartment of a vehicle having the steering wheel 210 on the right side. FIG. 16 illustrates in detail an air-conditioning operation panel 51 of the dashboard 200 in the passenger compartment shown in FIG. 15. FIG. 17 is a perspective view showing the passenger compartment of a vehicle having the steering wheel 210 on the left side.

On the other hand, the non-contact temperature sensor 72a is arranged in the dashboard 200 so as to face the passenger's seat (opposite to the driver's seat). The non-contact temperature sensor 72a is located nearer to the side of the steering wheel 210 than the center position of the dashboard 200.

The non-contact temperature sensor 71a (72a) will be described in detail with reference to FIG. 18 and FIG. 19.

The non-contact temperature sensor 71a of the third embodiment is a non-contact temperature sensor for detecting a surface temperature in a detection area in a non-contact manner. To be more specific, the non-contact temperature sensor 71a is an infrared sensor using a thermopile type detection device that generates an electromotive force proportional to the amount of infrared lays in response to a change in the amount of infrared lays. Here, the change of the amount of the infrared lays is caused by a change in the temperature of a body whose temperature is detected.

Figure 18:
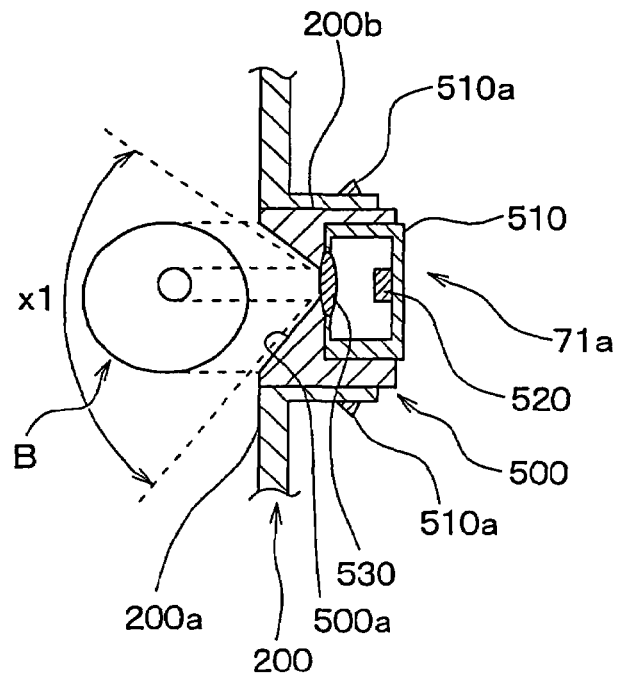
FIG. 18 is a partial sectional view showing a structure of the non-contact temperature sensor, according to the third embodiment.

The non-contact temperature sensor 71a, as shown in FIG. 18, is received in a recessed portion 200b of the dashboard 200 along with a cover 500. The cover 500 has an opening 500a that is made so as to face the driver's seat-side detection area whose temperature is detected, and is tapered in cross section. The cover 500 is formed so as to cover the non-contact temperature sensor 71a.

Therefore, the non-contact temperature sensor 71a is located nearer to the back side (opposite to the passenger compartment) than a design surface 200a of the dashboard 200.

The non-contact temperature sensor 71a has a rectangular thermocouple portion (detection element) 520 for converting a temperature difference between a hot contact point and a cold contact point into a voltage, and a can-shaped case 510 receiving this thermocouple portion 520 and having a window. This can-shaped case 510 is fixed to the dashboard 200 via the cover 500 by using a fitting claw 510a.

The can-shaped case 510 has the window and the window is formed to penetrate through the opening 500a. In this manner, the window is formed so as to face the driver's seat-side area where the surface temperature is to be detected through the opening 500a.

A lens 530 through which infrared lays enter from the detection area of the driver's seat side is attached to the window of the can-shaped 510. The infrared lays passing through the lens 530 are converted into heat by an infrared lay absorbing film (not shown).

This heat generates the temperature difference between the hot contact point and the cold contact point. Hence, the thermocouple portion 520 generates a voltage showing the temperature of the driver's seat-side detection area in response to the infrared lays entering from the driver's seat-side detection area.

The non-contact temperature sensor 72a is constructed substantially in the same surface as the non-contact temperature sensor 71a. The non-contact temperature sensor 72a generates a voltage showing the temperature of the passenger's seat-side detection area in response to the infrared lays entering from the passenger's seat-side detection area.

A length of a side of the thermocouple portion 520, a length of a side of the window, and the distance between the thermocouple portion 520 and the window are suitably set so as to adjust an angular range (angle of view) X1 where temperature can be detected. In FIG. 18, "B" shows the opening of the non-contact temperature sensor 71a (72a) and the lens 530.

Figure 19:
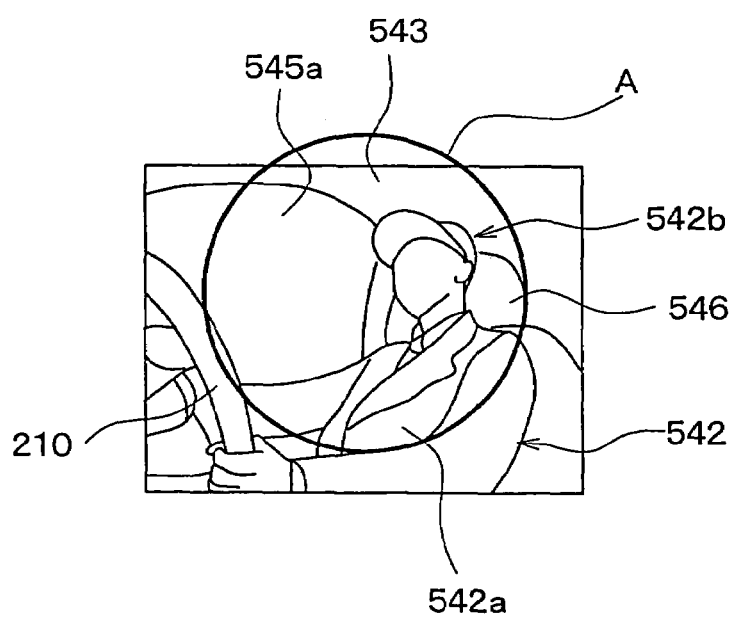
FIG. 19 is a schematic diagram showing a detection area of the non-contact temperature sensor according to the third embodiment.

FIG. 19 shows a temperature detection area A where temperature is to be detected by the non-contact temperature sensor 71a. The temperature detection area A includes an upper body (covered with clothes) 542a of a driver 542, a head portion 542b of the driver 542, a part of a ceiling 543, and a part of a side glass 545a of a front seat door.

In the temperature detection area A, the ceiling (i.e., the portion responsive to inside air temperature) is not exposed to solar radiation and is impervious to the outside air temperature by a heat insulating material, so the surface temperature of the ceiling changes approximately in response to the inside air temperature. The glass part (i.e., the portion responsive to outside air temperature) of the side glass 545a is affected by the inside air temperature and the outside air temperature, so that its surface temperature is mainly changed by the inside air temperature and the outside air temperature. The upper body (i.e., the portion responsive to solar radiation) 542a of the driver 542 is affected by the solar radiation, and its surface temperature is mainly changed by the solar radiation. Therefore, the non-contact temperature sensor 71a outputs a surface temperature signal including environmental information of the inside air temperature, the outside air temperature, and the amount of solar radiation.

The temperature detection area of the non-contact temperature sensor 72a includes the head of the passenger on the front passenger's seat side, a part of the ceiling on the front passenger's seat side and a part of side glass on the front passenger's seat side. The non-contact temperature sensor 72a outputs a surface temperature signal including the environmental information of the inside air temperature on the front passenger's seat side, the outside air temperature, and the amount of solar radiation.

Figure 20:
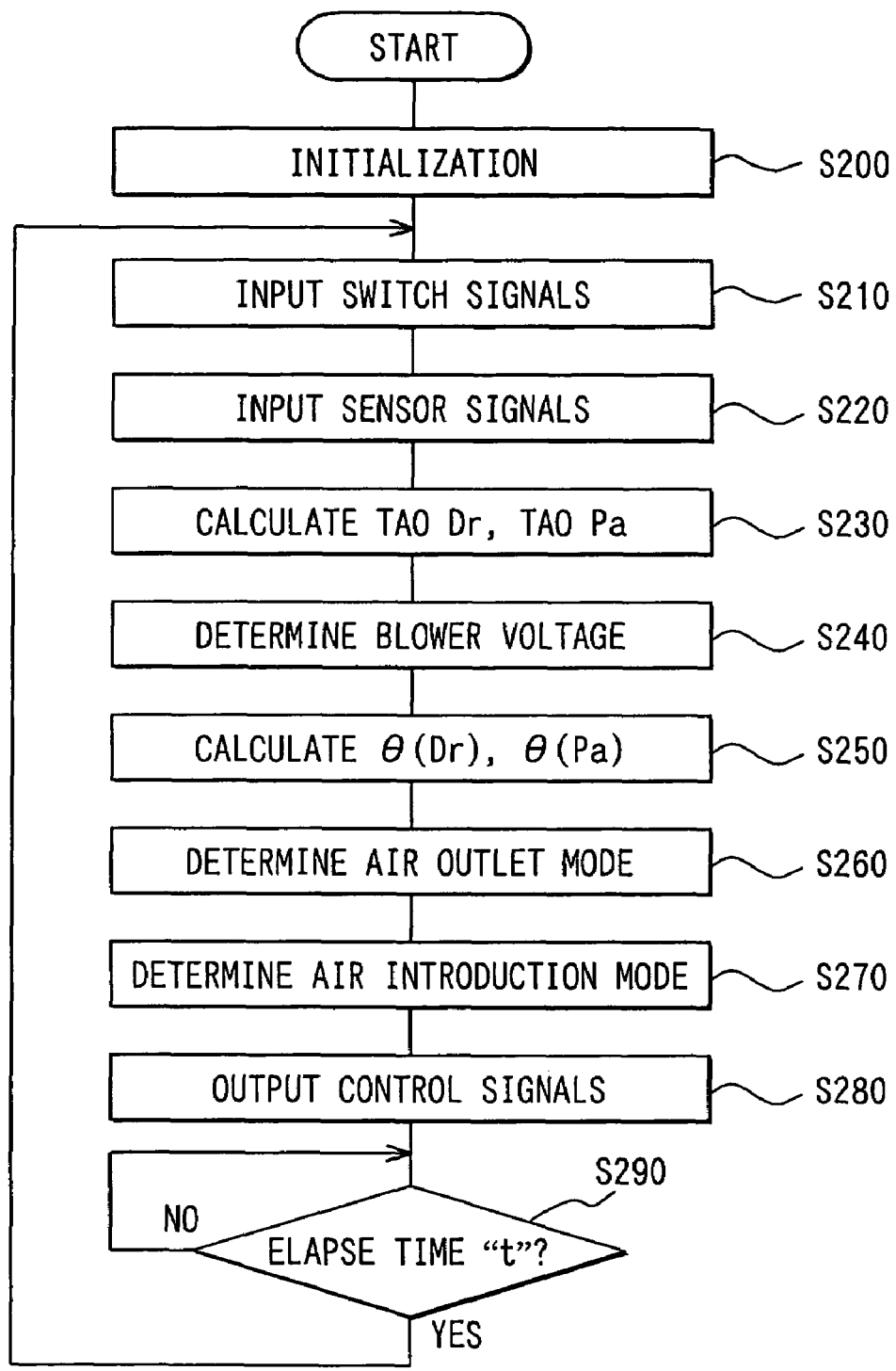
FIG. 20 is a flow diagram showing an air conditioning control of an air conditioning ECU according to the third embodiment.

Next, the operation of the vehicle air conditioner according to the third embodiment will be described with reference to FIG. 20. FIG. 20 is a flow chart showing an air-conditioning control processing executed by the ECU 10.

When the ignition switch IG is turned on, the air conditioning ECU 10 of this embodiment starts executing the computer program stored previously in a ROM according to a flow chart shown in FIG. 19.

That is, counters and flags used in the following control program are initialized at step S200, and then the control program proceeds to step S210. At step S210, switch signals such as a driver's seat-side set temperature TSETDr and a passenger's seat-side set temperature TSETPa which are set by the temperature setting switch 62 are input. Next, at step S220, sensor signals from the post-evaporator air temperature sensor 74 and the water temperature sensor 75 are input.

Further, at step S220, a driver's seat-side surface temperature TIRDr detected by the non-contact temperature sensor 71a and a passenger's seat-side surface temperature TIRPa detected by the non-contact temperature sensor 72a are read. In this embodiment, the step S210 and the step S220 construct detection signal input means.

At step S230, a driver's seat-side target air temperature TAODr is calculated by the use of the following equation 4 previously stored in the ROM on the basis of the set temperature TSETDr read at step S210 and the surface temperature TIRDr read at step S220.

$$TAODr = KsetDr \times TSETDr - KirDr \times TIRDr + CDr \quad \text{(Equation 4)}$$

where KsetDr and KirDr are coefficients and CDr is a constant.

A passenger's seat-side target air temperature TAOPa is calculated by the use of the following equation 5 previously stored in the ROM on the basis of the set temperature TsetPa read at step S210 and the surface temperature TIRPa read at step S220.

$$TAOPa = KsetPa \times TSETPa - KirPa \times TIRPa + CPa \quad \text{(Equation 5)}$$

where KsetPa and KirPa are coefficients and CDr is a constant.

At step S240, a blower voltage applied to the blower 23 is determined by a characteristic graph previously stored in the ROM 30b and shown in FIG. 7 on the basis of the target air temperatures TAODr, TAOPa obtained at step S230. In other words, the target amounts of air supplied to the driver's seat-side and the passenger's seat-side are determined.

At step S250, the target opening degree θ(Dr) of the driver's seat-side air mixing door 15 is calculated by the following equation 6 previously stored in the ROM on the basis of the driver's seat-side target air temperature TAODr obtained at step S230, an engine cooling water temperature TW detected by the water temperature sensor 75 and read at step S220, and the air temperature TE detected by the post-evaporator air temperature sensor 74.

$$\theta(Dr) = [(TAODr - TE)/(TW - TW)] \times 100(\%) \quad \text{(Equation 6)}$$

The target opening degree θ(Pa) of the passenger's seat-side air mixing door 16 is calculated by the following equation 7 previously stored in the ROM on the basis of the passenger's seat-side target air temperature TAOPa obtained at step S230, the engine cooling water temperature TW detected by the water temperature sensor 75 and read at step S220, and the air temperature TE detected by the post-evaporator air temperature sensor 74.

$$\theta(Pa) = [(TAOPa - Te)/(Tw - Te)] \times 100(\%) \quad \text{(Equation 7)}$$

At step S260, a driver's seat-side air outlet mode is determined among the face mode (FACE), the bi-level mode (B/L), and the foot mode (FOOT) in accordance with the characteristic graph previously stored in the ROM and shown in FIG. 8 on the basis of the calculated target air temperature TAODr.

Similarly, a passenger's seat-side air outlet mode is selected among the face mode (FACE), the bi-level mode (B/L), and the foot mode (FOOT) in accordance with the characteristic graph previously stored in the ROM and shown in FIG. 8 on the basis of the calculated target air temperature TAOPa.

At step S270, an air introduction mode is determined among the inside air introduction mode, the outside air introduction mode, and a mixture mode (half inside air mode), in accordance with the characteristic graph previously stored in the ROM and shown in FIG. 8 on the basis of the average value TAOe of the target air temperature TAODr and target air temperature TAOPa.

At step S280, a blower voltage control signal, an air mixing door opening degree control signal, an inside/outside air introduction mode control signal and an air outlet mode control signal are outputted to the drive circuit 8, the servomotor 5, the servomotors 17, 18, the servomotors 38, 39, and the servomotors 28, 29, respectively, according to the calculation results at the above steps S240 to S270.

At step S290, it is determined whether or not a predetermined cyclic time t (second) elapses. When a determination result at step S290 is NO, the control program stays at step S290. When the determination result at step S290 is YES, the control program returns to step S210.

The air-conditioning control is performed in the above manner. Hence, when the blower 4 blows the outside air from the outside air introduction port 7 or the inside air from the inside air introduction port 6 into the evaporator 41 in the air conditioning duct 2, the evaporator 41 cools the air passing therethrough.

The air mixing doors 15, 16 adjust a flow amount of the cooled air from the evaporator 41 into the heater core 42 and a flow amount of the cooled air bypassing the heater core 42.

The cooled air bypassing the heater core 42 and the warm air flowing through the heater core 41 are mixed in the first air passage 11. The mixed air is blown off into the passenger compartment from any one of the air outlets 20 to 23 according to the switching positions of the air outlet mode switching doors 24 to 26.

On the other hand, the cooled air bypassing the heater core 42 and the warm air flowing through the heater core 41 are mixed in the second air passage 12. The mixed air is blown off into the passenger compartment from any one of the air outlets 30 to 33 according to the switching positions of the air outlet mode switching doors 34 to 36.

The amount of air blown off from any one of the air outlets 20 to 23 and 30 to 33, as described above, is controlled by the blower voltage applied to the blower motor 23. Since the cooled air bypassing the heater core 42 and the warm air flowing through the heater core 41 are mixed, as described above, the temperature of the mixed air, that is, the air temperature blown off from any one of the air outlets 20 to 23 and 30 to 33 is adjusted.

Next, the operation and effect according to the third embodiment will be described. The vehicle air conditioner of this embodiment is provided with the air-conditioning unit 1 for adjusting the air state on the driver's seat-side in the passenger compartment, the non-contact temperature sensor 71a that is arranged in the dashboard 200 so as to face the driver's seat side and detects the surface temperature in the driver's seat-side temperature detection area in non-contact, and the air conditioning ECU 10 that adjusts the amount and the temperature of the air to be blown to the driver's seat-side by the air-conditioning unit 1. The non-contact temperature sensor 71a is located nearer to the position opposite to the steering wheel 210 than the center portion of the dashboard 200.

Thus, the area occupied by the steering wheel 210 in the temperature detection area (the solid line A in FIG. 9) of the non-contact temperature sensor 71a can be reduced as compared with a case where the non-contact temperature sensor 71a is located nearer to the steering wheel 210 than the center portion of the dashboard 200.

Thus, among the temperature detection area of the non-contact temperature sensor 71a, the area in which temperature essentially needs to be detected, that is, the area which is occupied by the ceiling 543, the glass portion of the side window glass 545a, and the upper body 542a of the driver 542 can be increased. Hence, this can reduce a detection error in the detection temperature of the non-contact temperature sensor 71a and hence can properly adjust the air state in the passenger compartment.

In the third embodiment, the front passenger's seat-side non-contact temperature sensor 72a is located nearer to the steering wheel 210 than the center portion of the dashboard 200. Thus, the non-contact temperature sensors 71a, 72a are located symmetrically in the vehicle lateral direction, and it can enhance the appearance of the non-contact temperature sensors 71a, 72a in the passenger compartment.

Accordingly, as compared with a case where the front passenger's seat-side non-contact temperature sensor 72a is located nearer to a position opposite to the steering wheel 210 than the center portion of the dashboard 200, the distance between the front passenger's seat-side non-contact temperature sensor 72a and the front passenger's seat-side temperature detection area can be increased. Hence, a non-contact temperature sensor having a small angular range where temperature can be detected can be used as the non-contact temperature sensor 72a.

At least one of the non-contact temperature sensors 71a, 72a is located at the back side than the design panel 200a of the dashboard 200. Hence, the distance between the non-contact temperature sensors 71a, 72a and the temperature detection area can be further increased. Therefore, a non-contact temperature sensor having a further smaller angular range where temperature can be detected can be used as the non-contact temperature sensors 71a, 72a.

Fourth Embodiment

Figure 21:
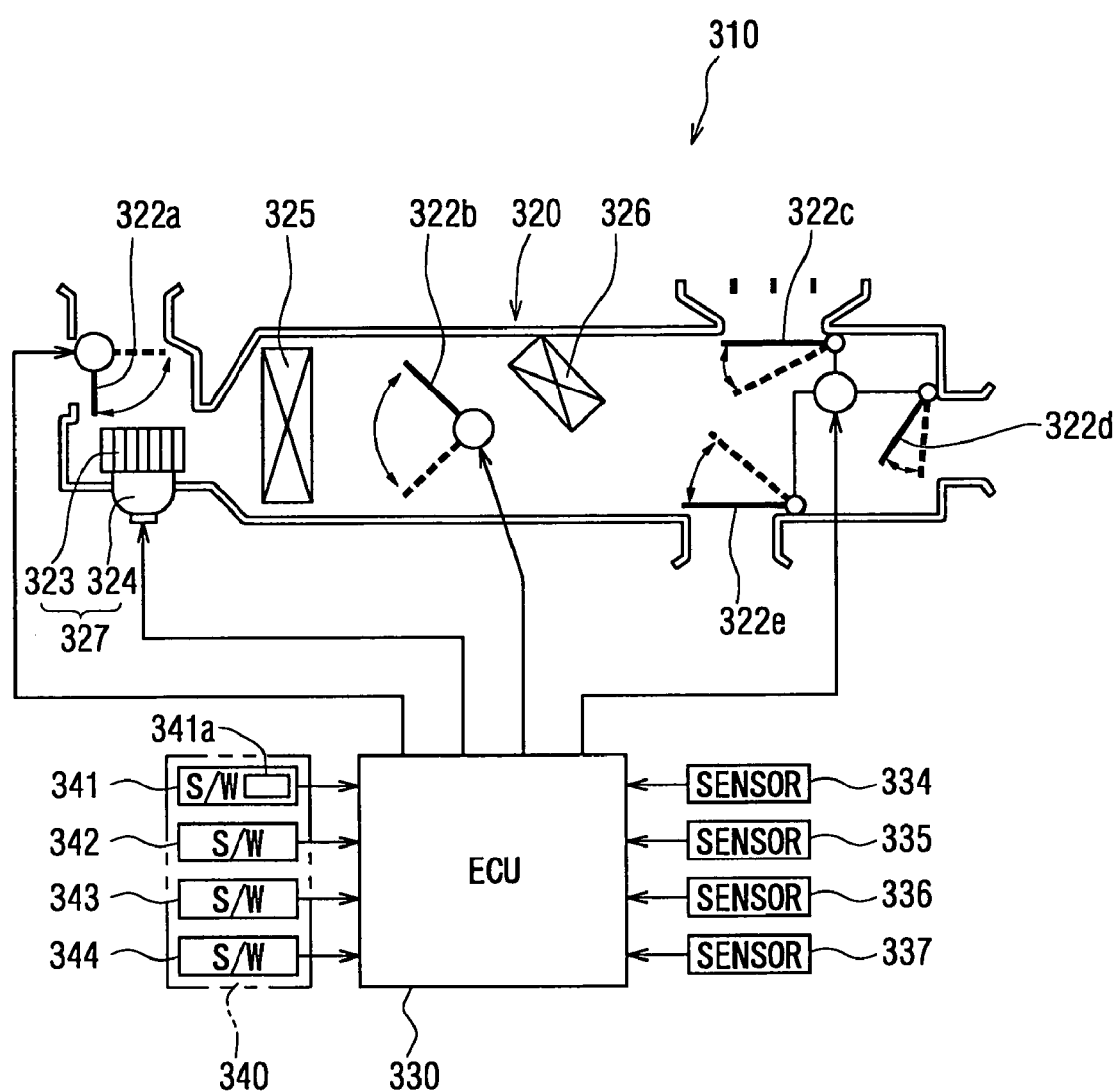
FIG. 21 is a schematic diagram showing an entire structure of a vehicle air conditioner according to a fourth embodiment of the present invention.

FIG. 21 is a schematic diagram showing a general construction of an air conditioner 310 for a vehicle in a fourth embodiment to which the present invention is typically applied.

An air-conditioning unit 320 of the vehicle air conditioner 310 is arranged at a front side of the dashboard that is positioned on the front side in the passenger compartment. An inside/outside air switching door 322a is placed at a most upstream side of the air-conditioning unit 320. This inside/outside air switching door 322a is disposed to construct an inside/outside air introduction mode, and is located at a portion where an outside air introduction port is separated from an inside air introduction port and is turned by an actuator to adjust a flow rate of the inside air introduced into the air-conditioning unit 320 and the outside air introduced into the air-conditioning unit 320.

A blower 327 of an air blowing unit includes a blower motor 324 and a fan 323 fixed to the blower motor 324. The blower 327 sucks air into the air-conditioning unit 320 and blows the sucked air to the downstream side of the air-conditioning unit 320 and into the passenger compartment. An evaporator 325 and a heater core 326 are provided on the downstream side of the blower 327.

The evaporator 325 is combined with a compressor (not shown) to construct a refrigeration cycle to cool the air passing therethrough. An engine-cooling water (not shown) is circulated in the heater core 326 to heat the air passing through the heater core 326.

An air mixing door 322b is provided at an upstream side of the heater core 326 and an opening degree of the air mixing door 322b is adjusted by an actuator (not shown). Therefore, the flow rate of the air passing through the heater core 326 to the air bypassing the heater core 326 is adjusted to control the temperature of the air blown off into the passenger compartment at the most downstream side. As the opening degree of the air mixing door 322b is smaller, the temperature of the air is further reduced.

On a most downstream side of the air-conditioning unit 320, a defroster door 322c, a face door 322d, and a foot door 322e are disposed to set an air outlet mode. By operating these doors 322c, 322d, and 322e with the actuator (not shown), conditioned air having a controlled temperature is blown into the passenger compartment in each air outlet mode.

The amount of air blown by the blower 327 in the air-conditioning unit 320 and the opening degrees of the various doors 322a, 322b, 322c, 322d, and 322e are controlled by a control device 330 (ECU). To be more specific, the blower 327 and the doors 322a, 322b, 322c, 322d, 322e are controlled via a voltage controller and an actuator (both not shown) on the basis of the output signal from the control device 330. The control device 330 is a well-known computer provided with a central processing unit and a storage element (both not shown).

Environmental conditions relating to an air-conditioning of the passenger compartment are inputted to the control device 330 by environmental condition detection means including the outside air temperature sensor 334 for detecting the outside air temperature outside the passenger compartment, a water temperature sensor 335 for detecting an engine-cooling water temperature, a solar radiation sensor 336 for detecting the amount of solar radiation entering into the passenger compartment, an infrared sensor (hereinafter referred to as "IR sensor") 337 which will be later described, and a post-evaporator temperature sensor (not shown) for detecting air temperature on the downstream side of the evaporator 325.

Output signals inputted from an operating unit 340 are inputted. The operating unit 340 is constructed of an automatic control switch 341 for setting an automatic control condition, an air outlet mode switching switch (face, bi-level, foot, foot/defroster, defroster) 342, a temperature setting switch 343, an air amount switching switch 344, and an inside/outside air switching switch (not shown). In the automatic control switch 341, an LED 341a which is lit when the automatic control condition is set is provided.

The control device 330 is so constructed as to control the blower 327 and the various kinds of doors 322a, 322b, 322c, 322d, and 322e on the basis of the signals from the various kinds of sensors and switches according to procedures to be described later.

Figure 22:
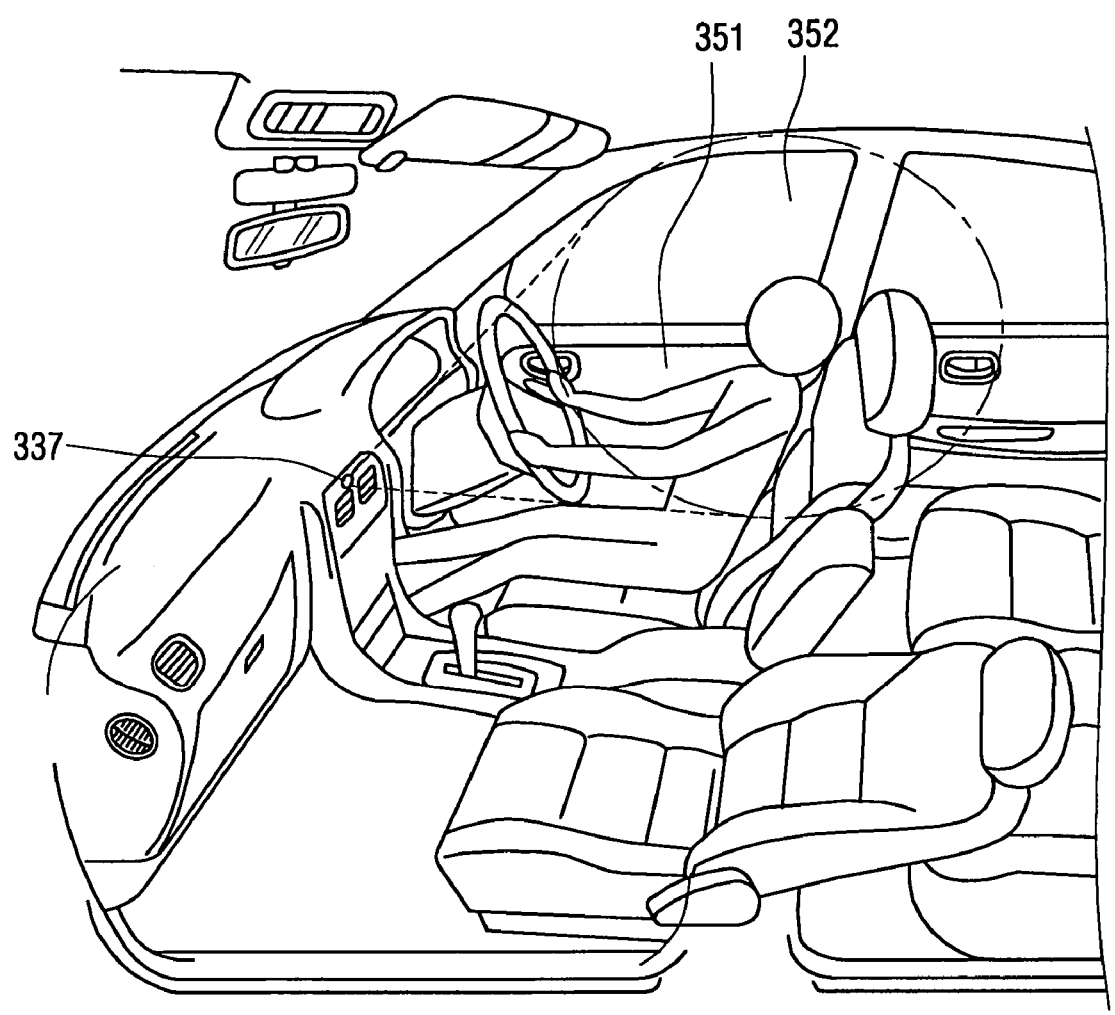
FIG. 22 is a perspective view showing a detection area of a non-contact temperature sensor in a passenger compartment, according to the fourth embodiment.

The IR sensor 337 which is one of the environmental condition detection means will be described. The IR sensor 337, as shown in FIG. 22, is arranged in a center portion of the dashboard on the front side in the passenger compartment and detects an intensity of infrared lays radiated from a temperature detection area surrounded by a single dot and dash line in FIG. 22. The IR sensor 337 detects a surface temperature in the passenger compartment in an interior surface of the door 351 and an inside surface of a window glass 352, and the surface temperature of the passenger in non-contact. The IR sensor 337 outputs the detected surface temperature to the control device 330. The IR sensor 337 is a non-contact temperature sensor in the fourth embodiment.

Next, the operation of the vehicle air conditioner 310 will be described on the basis of the above construction.

Figure 23:
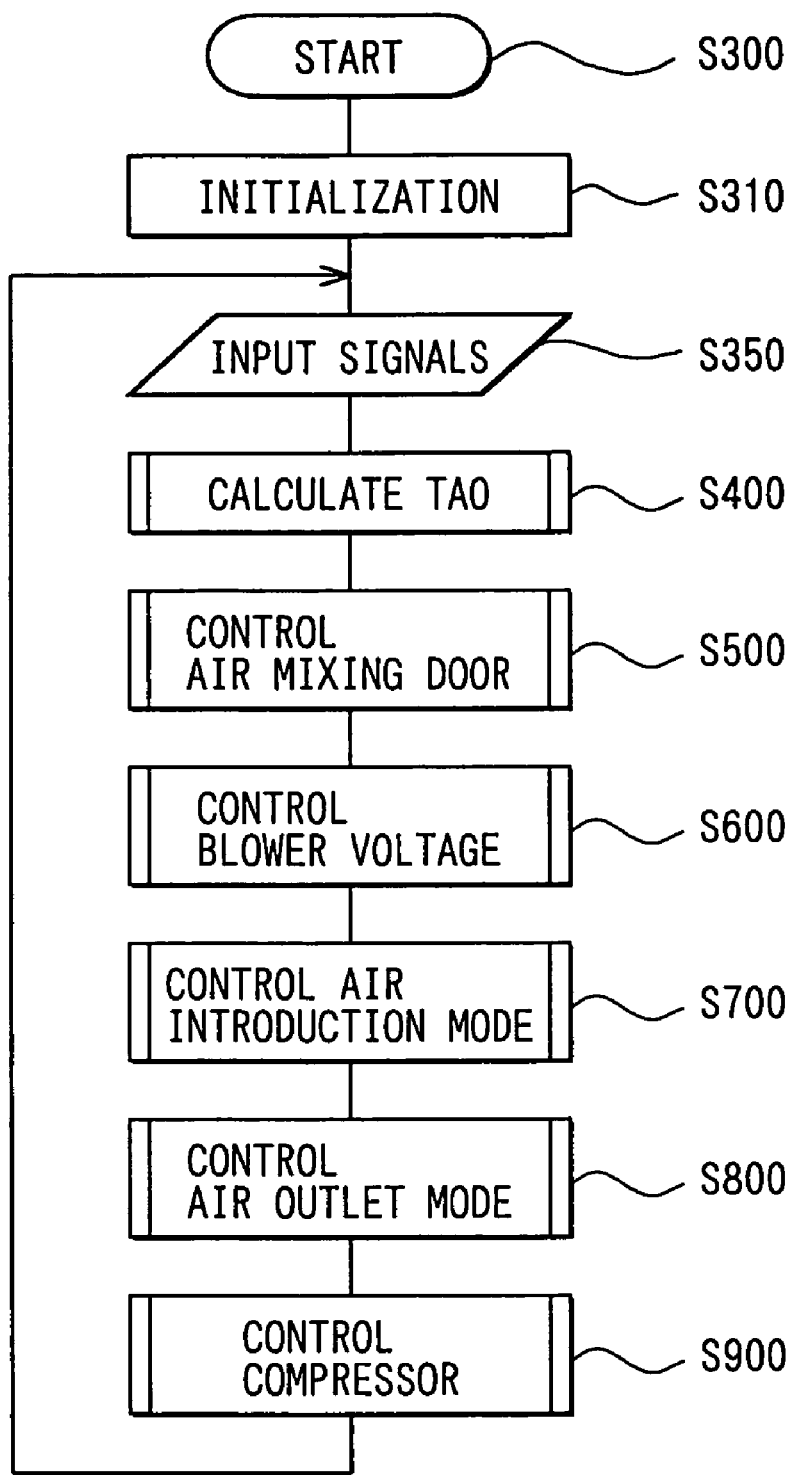
FIG. 23 is a flow diagram showing an air conditioning control of an air conditioning ECU, according to the fourth embodiment.

FIG. 23 is a flow chart showing a general control of the control device 330. As shown in FIG. 23, the control device 330 starts a control program at step S300 when the ignition switch of the vehicle is turned on. The control program proceeds to step S310 where the initial values of various kinds of conversions and flags are set.

At step S350, the environmental conditions are inputted by the sensor signals from the outside air temperature sensor 334, the water temperature sensor 335, the solar radiation sensor 336, and the IR sensor 337 and the operation states are inputted by the operating unit 340.

The control program proceeds to step S400 where a target air temperature (hereinafter referred to as "TAO") of the conditioned air to be blown into the passenger compartment is calculated by the use of the signals inputted at step S350.

Figure 24:
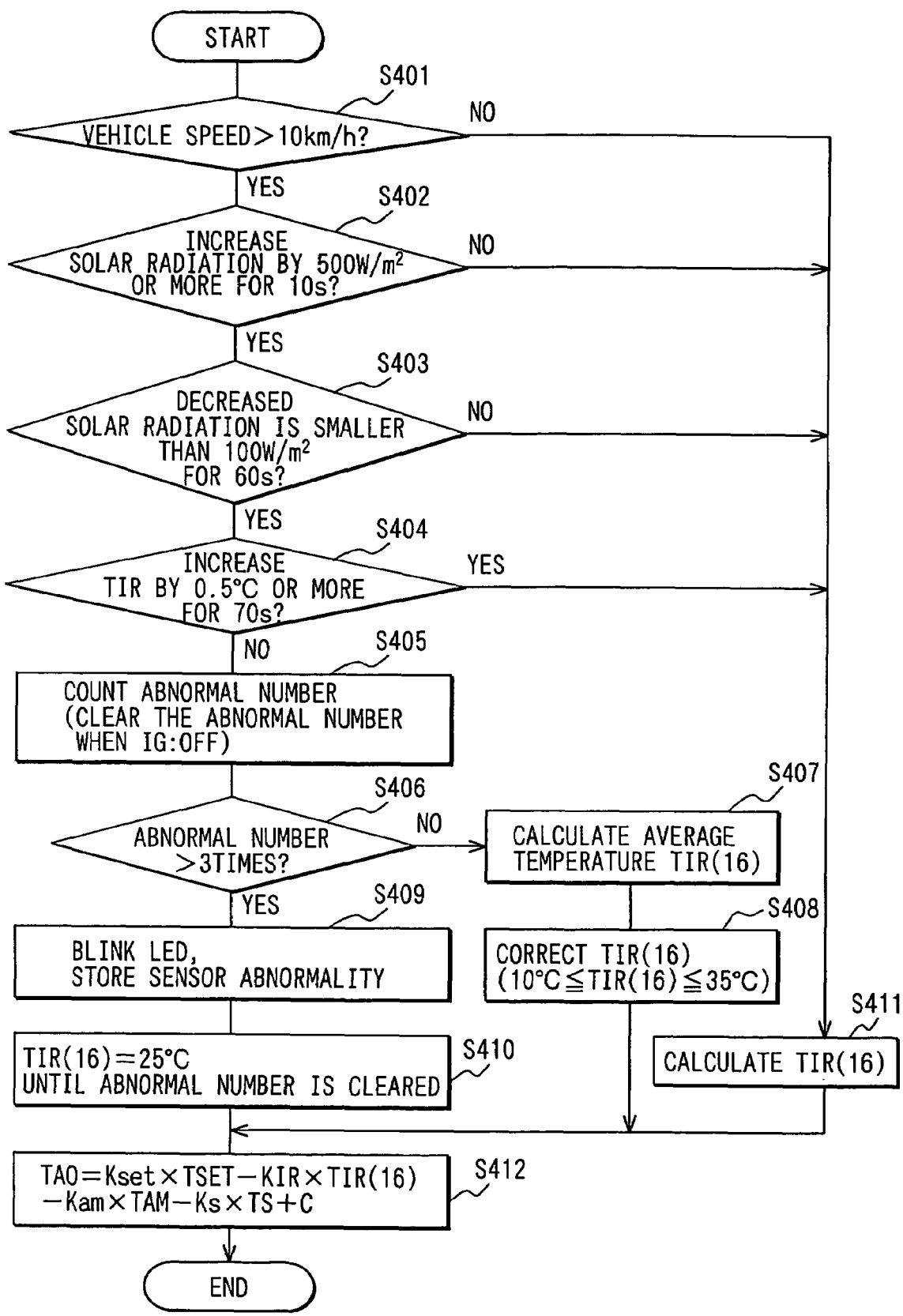
FIG. 24 is a flow diagram showing a control operation of step S400 in FIG. 23, according to the fourth embodiment.

A calculation of the TAO at step S400 will be described in detail on the basis of the flow chart shown in FIG. 24.

First, at step S401, it is determined whether or not a vehicle speed is faster than 10 km/h. The determination of the vehicle speed is made on the basis of a signal from a speed detection part of the vehicle or an information signal relating to a vehicle speed from an in-vehicle communication path. Here, the reason why the determination is made on the basis of the vehicle speed is as follows. That is, when the vehicle speed is slow or the vehicle stops, there is a case where the door 351 of the vehicle is open. Thus, when it is determined in this state whether or not the detection of the IR sensor 337 is abnormal, an improper determination may be made.

In a case where it is determined at step S401 that the vehicle speed is faster than 10 km/h, the control program proceeds to step S402 where it is determined whether the amount of solar radiation detected by the solar radiation sensor 336 increases 500 W/m$^2$ or more for a period of 10 seconds. In a case where the amount of solar radiation increases 500 W/m$^2$ or more for 10 seconds, it is determined at step S403 whether or not a decrease in the amount of the solar radiation for a period of 60 seconds is less than 100 W/m$^2$.

In a case where the decrease in the amount of the solar radiation is less than 100 W/m$^2$ for 60 seconds, the control program proceeds to step S404 where it is determined whether the temperature TIR detected by the IR sensor 337 increases 0.5° C. or more for a period of 70 seconds after the amount of the solar radiation increases, that is, in a period during which the solar radiation is detected so as to make the determination at steps S402, 403.

In this case, when the temperature TIR detected by the IR sensor 337 does not increase 0.5° C. or more, it is determined that the temperature detected by the IR sensor 337 is abnormal. That is, even if the amount of solar radiation entering into the passenger compartment is increased, the IR sensor 337 cannot detect a temperature increase in a predetermined region in the passenger compartment, which corresponds to the increase in the amount of solar radiation. Therefore, in this case, it is determined that the temperature detected by the IR sensor 337 is abnormal. In this case, the control program proceeds to step S405 where the number of abnormalities of the IR sensor 337 is counted by one. The counted number is integrated, and is cleared when the ignition switch of the vehicle is turned off.

After the control operation at step 405 is performed, the control program proceeds to step S406. At step S406, it is determined whether or not the number (abnormal number) of integrated counts of the abnormal states of the IR sensor 337 is more than 3. In a case where the number of integrated counts is 3 or less, the control program proceeds to step S407. At step S407, 16 temperatures TIR detected by the IR sensor 337 at intervals of 250 ms are averaged to calculate an average temperature TIR(16).

Next, at step S408, the average temperature TIR(16) is corrected such that the average temperature TIR(16) is in a range between 10° C. and 35° C. That is, when the average temperature TIR(16) is less than 10° C. or more than 35° C., the average temperature TIR(16) is replaced by 10° C. or 35° C. In this manner, at step 408, the average temperature TIR(16) is set in a provisional temperature range between 10° C. and 35° C.

When the number of integrated counts of the abnormal states of the IR sensor 337 is 4 or more at step S406, the control program proceeds to step S409. At step S409, the LED 341a of the automatic control switch 341 is blinked and the abnormality of the IR sensor 337 is stored. At step S410, the average temperature TIR(16) is set at a provisional temperature of 25° C. until the number of integrated counts of the abnormal states is cleared. Here, the LED 341a is notification means in this embodiment.

In a case where the determination result at each of steps S401, S402, and S403 is NO and in a case where the determination result at step 404 is YES, the control program proceeds to step S411. The former case shows a state where the abnormal state of the IR sensor 337 cannot be determined and the latter case shows a state where the IR sensor 337 normally detects the temperature in the predetermined area in the passenger compartment. At step S411, 16 temperatures TIR detected at intervals of 250 ms by the IR sensor 337 are averaged to calculate the average temperature TIR(16).

After the processing of any one of steps S408, S410, and S411 is performed, next, the control program proceeds to step S412 where the calculated or provisional average temperature TIR(16) is substituted into the following equation 8 to calculate the TAO of the conditioned air to be blown into the passenger compartment.

$$TAO = Kset \times TSET - KIR \times TIR(16) - Kam \times TAM - Ks \times TS + C \quad \text{[Equation 8]}$$

where Kset (for example, 7.0), KIR (for example, 5.1), Kam (for example, 1.0), and Ks are coefficients, respectively, C is (for example, −45) is a constant, TSET is a set temperature, TAM is an outside air temperature, and TS is the amount of solar radiation entering into the passenger compartment.

After the processing at step S400 is performed, next, at step S500, the opening degree of the air mixing door 322b responsive to the TAO is calculated from the opening control characteristic of the air mixing door 322a previously stored in the control device 330. An actuator (not shown) is controlled in such a manner that the opening degree of the air mixing door 322a becomes the calculated opening degree to control the temperature of the air blown into the passenger compartment from the respective air outlets.

After the air mixing control is performed at step S500, the control program proceeds to step S600 where a blower voltage applied to the blower 327 corresponding to the TAO and the like is calculated from a blower voltage characteristic previously stored in the control device 330 and is applied to the blower 327 via a drive circuit (not shown) to drive the blower 327, thereby controlling the amount of air blown off into the passenger compartment.

At step S700, an inside/outside air introduction mode corresponding to the TAO and the like is calculated from an inside/outside air mode control characteristic previously stored in the control device 330 to drive and control an actuator for driving the inside/outside air switching door 322a.

At step S800, an air outlet mode corresponding to the TAO and the like is calculated from an air outlet mode control characteristic previously stored in the control device 330 to drive and control an actuator (not shown) for driving a defroster door 322c, a face door 322d, and a foot door 322e.

At steps S500, S600, S700, and S800, in a case where the air temperature, the amount of the air to be blown and the respective modes are selected manually with the respective switches of the operating unit 340, the blower 327 and the respective doors 322a to 322e are controlled such that the air temperature, the amount of the air to be blown and the respective modes become the manually selected ones, respectively.

Next, the control program proceeds to step S900 where a compressor (not shown) is controlled. After the processing at step S900 is performed, the control program returns to step S350 where various kinds of signals are read again and then the control steps S350 to S900 of air-conditioning control are repeatedly performed.

According to the above construction and operation, when the detection area of the IR sensor 337 is occupied by a substance such as beverage at a temperature different from the temperature in the passenger compartment, it can be determined on the basis of relation to the detection value of the solar radiation sensor 336 that the temperature detected by the IR sensor 337 is abnormal.

When it is determined that the temperature detected by the IR sensor 337 is abnormal, the temperature in the predetermined area in the passenger compartment is replaced by the provisional temperature and the air-conditioning state in the passenger compartment is controlled on the basis of this provisional temperature. Therefore, even if the temperature detected by the IR sensor 337 is abnormal, the air-conditioning state of the passenger compartment can be controlled on the basis of the provisional temperature, so the passenger hardly feels uncomfortable.

In a case where the detection abnormalities of the IR sensor 337 are repeated, the LED 341a of the automatic control switch 341 is blinked to notify the passenger of the detection abnormalities. Hence, this can urges the passenger to make a correction toward the normal state of detection.

Further, the LED 341a is blinked in a case where the detection abnormalities of the IR sensor 337 are repeated by a predetermined number of times. Hence, when the detection abnormalities are repeated by the passenger's hand frequently coming near to the IR sensor 337 at the time of operating switches of the operating unit 340, the LED 341a can be prevented from blinking frequently. Therefore, the passenger hardly feels uneasy and troublesome.

Still further, since the determination at step S401 is provided, when the door 351 of the vehicle is open, it can prevent making an error determination that the temperature detected by the IR sensor 337 is abnormal.

Fifth Embodiment

Next, the fifth embodiment will be described with reference to FIG. 25. This fifth embodiment is different from the fourth embodiment described above in the calculation step of TAO at step S400 shown in FIG. 23. The same parts as in the fourth embodiment are denoted by the same reference symbols and their descriptions are omitted.

The vehicle air conditioner 310 in accordance with the fifth embodiment is not provided with a solar radiation sensor. Other construction is the same as the vehicle air conditioner in accordance with the fourth embodiment.

Figure 25:
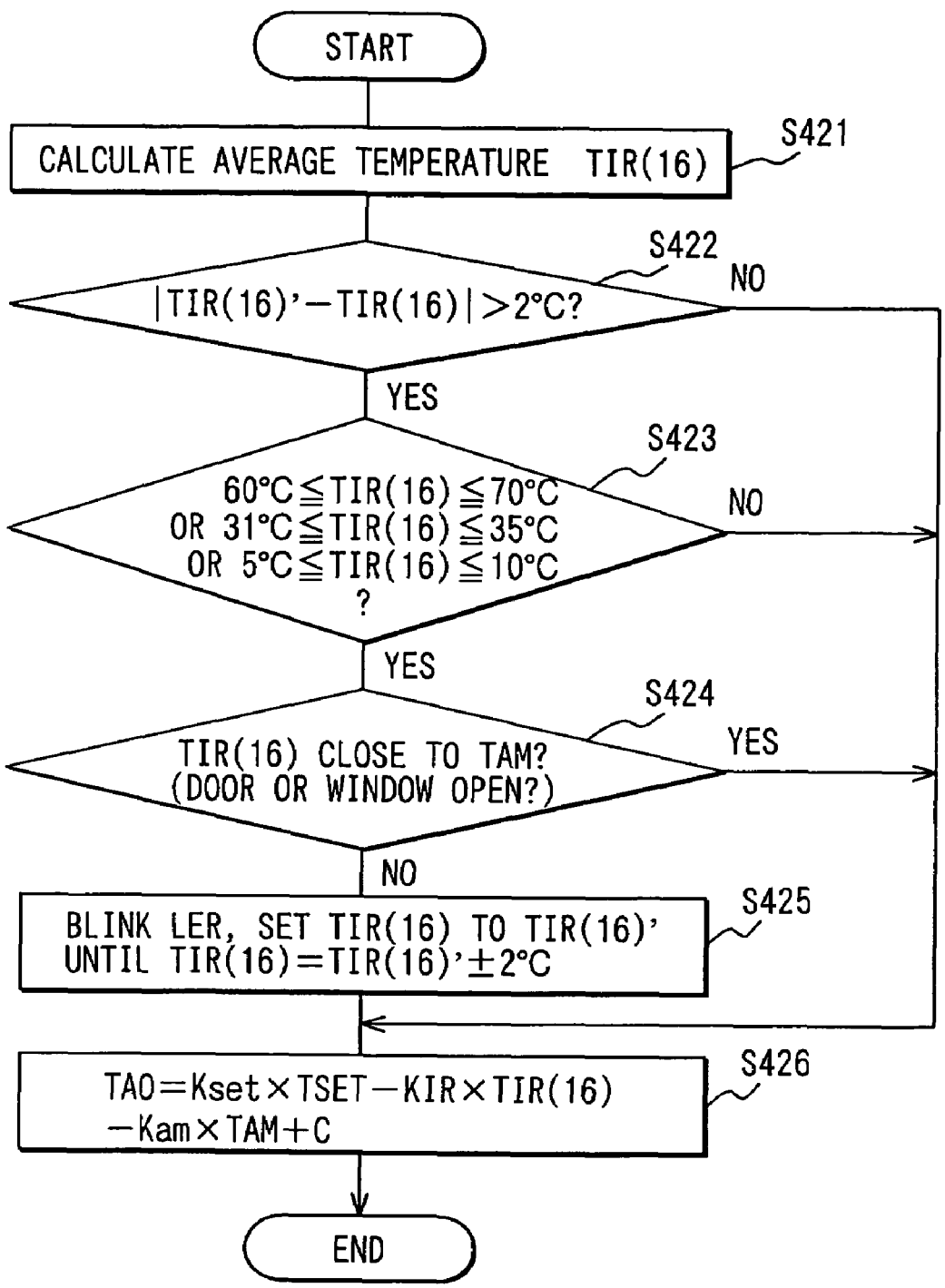
FIG. 25 is a flow diagram showing a control operation of step S400 in FIG. 23, according to a fifth embodiment of the present invention.

When the control device 330 executes step S400, as shown in FIG. 25, at step S421, 16 temperatures TIR detected at intervals of 250 ms by the IR sensor 337 are averaged to calculate the average temperature TIR(16).

At step S422, it is determined whether or not a difference between the average temperature TIR(16)' calculated at the last time and the average temperature TIR(16) calculated at the present time is 2° C. or more. In other words, it is determined whether or not a change in temperature for 4 seconds is 2° C. or more.

When it is determined at step S422 that the change in temperature for 4 seconds is 2° C. or more, it is determined at step S423 whether or not the average temperature TIR(16) (i.e., average temperature TIR(16) calculated at the present time) is within any one of temperature ranges of 60° C. to 70° C., 31° C. to 35° C., 5° C. to 10° C.

Here, the temperature range of 60° C. to 70° C. is a temperature range in a case of assumption that the major portion of the detection area of the IR sensor 337 is occupied by hot beverage (for example, hot caned coffee), the temperature range of 5° C. to 10° C. is a temperature range in a case of assumption that the major portion of the detection area of the IR sensor 337 is occupied by cold beverage (for example, cold caned coffee), and the temperature range of 31° C. to 35° C. is a temperature range in a case of assumption that the major portion of the detection area of the IR sensor 337 is occupied by the passenger's hand.

When it is determined at step S423 that the average temperature TIR(16) calculated at the present time is within the above temperature ranges, the control program proceeds to step S424. In other words, in a case where it is determined at steps S422 and S423 that the temperature detected by the IR sensor 337 reaches the temperature of a thermal substance which is thought to be at a temperature different from the temperature in the passenger compartment, the control program proceeds to step S424.

At step S424, it is determined whether or not the average temperature TIR(16) calculated on the basis of the temperature TIR detected at the present time becomes nearer to the outside air temperature TAM detected by the outside air temperature sensor 334 as compared with the average temperature TIR(16)' calculated on the basis of the temperature TIR detected at the last time and whether or not the door 351 or the window 334 is open. Whether or not the door 351 or the window 334 is open is determined on the basis of the signal from the opening/closing detection part of the door 351 and the window 352 or the information signal relating to the opening/closing of the door 351 and the window 352 from the in-vehicle communication path.

When the determination result at step S424 is NO, it is determined that an error determination is not made by the effect of the outside air introduced into the passenger compartment but the IR sensor 337 detects an abnormal temperature caused by the thermal substance as described above, and the control program proceeds to step S425. At step S425, the LED 341a of the automatic control switch 341 is blinked and the average temperature TIR(16) is fixed at the average temperature TIR(16)' (provisional temperature) which is calculated on the basis of the temperature TIR detected immediately before the detection of abnormal temperature, and the fixed state is held until the average temperatures TIR(16) to be calculated at step S421 for the next time and subsequent times become within a temperature range of ±2° C. with respect to the average temperature TIR(16)' calculated on the basis of the temperature TIR detected immediately before the detection of abnormal temperature.

After the processing at step S425 is performed, the control program proceeds to step S426. Further, also in a case where the determination result at each of steps S422 and S423 is NO and in a case where the determination at step S424 is YES, the control program proceeds to step S426. At step S426, the calculated or provisionally set average temperature TIR(16) is substituted into the following equation 9 to calculate the TAO to be blown into the passenger compartment.

$$TAO = Kset \times TSET - KIR \times TIR(16) - Kam \times TAM + C \quad \text{[Equation 9]}$$

where Kset (for example, 7.0), KIR (for example, 5.1), Kam (for example, 1.0), are coefficients, respectively, C is (for example, −45) is a constant, TSET is a set temperature, and TAM is an outside air temperature.

In a case where the detection area of the IR sensor 337 is occupied by a thermal substance whose temperature is different from the temperature in the passenger compartment, it is determined that the temperature detected by the IR sensor 337 is abnormal on the basis whether or not the detection temperature reaches a predetermined temperature range relating to the thermal substance for a predetermined time period.

In a case where it is determined that the temperature detected by the IR sensor 337 is abnormal, the temperature in the predetermined area in the passenger compartment is replaced by the provisional temperature before the detection of the abnormal temperature and the air-conditioning state of the passenger compartment is controlled based on this provisional temperature. Therefore, even if the IR sensor 337 detects the abnormal temperature, the air-conditioning state of the passenger compartment is controlled on the basis of this provisional temperature, so the passenger hardly feels uncomfortable.

In a case where the IR sensor 337 is in the state of abnormal detection, the LED 341a of the automatic control switch 341 is blinked to notify the passenger of the state of abnormal detection. Therefore, this can urge the passenger to remove the thermal substance described above. Thus, the state of normal detection can be rapidly returned.

The determination at step S424 can prevent the error determination of the IR sensor 337, when the door 351 of the vehicle is open and a large amount of outside air enters into the passenger compartment.

Sixth Embodiment

Next, the sixth embodiment will be described with reference to FIG. 26. This sixth embodiment is different in the calculation step of TAO at step S400 shown in FIG. 23 from the fourth embodiment described above. The same parts as in the fourth and fifth embodiments are denoted by the same reference numbers and their descriptions are omitted.

In the sixth embodiment, a vehicle air conditioner 310 is not provided with the solar radiation sensor, similarly to the fifth embodiment. The other construction is the same as the vehicle air conditioner 310 of the fourth embodiment.

Figure 26:
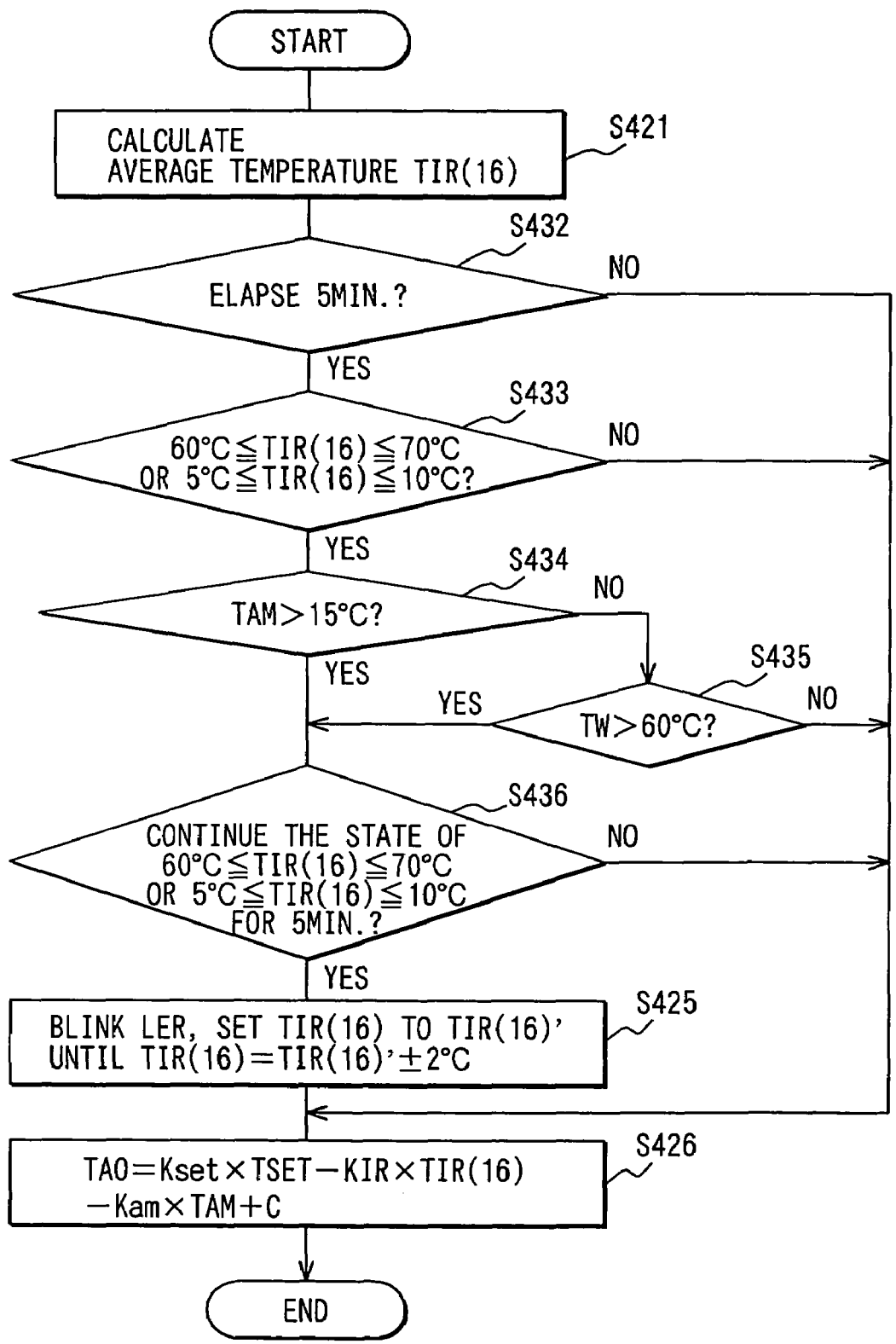
FIG. 26 is a flow diagram showing a control operation of step S400 in FIG. 23, according to a sixth embodiment of the present invention.

When the control device 330 performs the processing at step S400 in FIG. 23, as shown in FIG. 26, first, the processing at step S421 is performed just as with the fifth embodiment. Then, it is determined at step s432 whether or not the 5 minutes elapse after the conditioned air is blown off into the passenger compartment. In a case where it is determined that 5 minutes elapse after the conditioned air is blown off into the passenger compartment, the control program proceeds to step S433. At step S433, it is determined whether or not the average temperature TIR(16) (calculated at the present time) is within a temperature range of any one of 60° C. to 70° C. and 5° C. to 10° C.

The temperature range of 60° C. to 70° C. is a temperature range in a case of assumption that the major portion of the detection area of the IR sensor 337 is occupied by a hot beverage (for example, hot caned coffee). The temperature range of 5° C. to 10° C. is a temperature range in a case of assumption that the major portion of the detection area of the IR sensor 337 is occupied by a cold beverage (for example, cold caned coffee).

In a case where it is determined at step S433 that the average temperature TIR(16) calculated at the present time is within the above two temperature ranges, the control program proceeds to step S434. That is, in a case where it is determined at steps S433 that the temperature detected by the IR sensor 337 is a temperature which is different from the temperature in the passenger compartment and is thought to be the temperature of the thermal substance, the control program proceeds to step S434.

At step S434, it is determined whether or not the outside air temperature TAM detected by the outside air temperature sensor 334 is more than 15° C. In a case where the outside air temperature detected by the outside air temperature sensor 334 is 15° C. or less, the control program proceeds to step S435 where it is determined whether or not the cooling water temperature TW detected by the cooling water temperature sensor 335 is more than 60° C. When the outside air temperature TAM is more than 15° C. or the cooling water temperature TW is more than 60° C. (the engine is not being warmed up), the control program proceeds to step S436.

At step S436, it is determined whether or not a state where the average temperature TIR(16) (calculated at the present time) is within any one of temperature ranges of 60° C. to 70° C. and 5° C. to 10° C. continues for 5 minutes or more. When this state of TIR(16) continues for 5 minutes or more, it is determined that the IR sensor 337 detects the abnormal temperature of the thermal substance described above and the control program proceeds to step S425, similarly to step S425 of the fifth embodiment.

After the processing at step S425 is performed, the control program proceeds to step S426. Also in a case where the determination result at each of steps S432, S433, S435, and S436 is NO, the control program proceeds to step S426. The processing at step S426 is performed so that the TAO is calculated.

According to the sixth embodiment, in a case where the detection area of the IR sensor 337 is occupied by the thermal substance having a temperature different from the temperature in the passenger compartment, an abnormal determination of the detected temperature of the IR sensor 337 can be performed on the basis of whether or not the detected temperature is within the predetermined temperature range relating to the thermal substance for the predetermined time period.

In a case where it is determined that the temperature detected by the IR sensor 337 is abnormal, the temperature in the predetermined area in the passenger compartment is replaced by the provisional temperature before the detection of abnormal temperature, and the air-conditioning state in the passenger compartment is controlled on the basis of this provisional temperature. Therefore, even if the temperature detected by the IR sensor 337 is abnormal, the air-conditioning state in the passenger compartment can be controlled on the basis of this provisional temperature and hence the passenger hardly feels uncomfortable.

In a case where the temperature detected by the IR sensor 337 is abnormal, the LED 341a of the automatic control switch 341 is blinked to notify the passenger of the abnormal temperature detection. Therefore, this can urge the passenger to remove the thermal substance described above so that the abnormal temperature detection can be changed to the normal temperature detection.

Other Embodiment

Although the present invention has been fully described in connection with the preferred embodiments thereof with reference to the accompanying drawings, it is to be noted that various changes and modifications will become apparent to those skilled in the art.

For example, in the above-described second embodiment, the example in which the driver's seat-side sensor unit 80b can be displaced has been described. However, in place of the driver's seat-side sensor unit 80b, the passenger's seat-side sensor unit 80a can be displaced. Further, the driver's seat-side sensor unit 80b and the passenger's seat-side sensor unit 80a can be displaced, respectively.

Further, the above mentioned first and third embodiment may be performed in combination.

In the respective embodiments, the non-contact temperature sensor is not limited to the thermopile type detection element, but an infrared sensor using a bolometer type detection device constructed of a resistor having a large temperature coefficient and an infrared sensor of the other type can be also used as the non-contact temperature sensor.

In the fourth to sixth embodiments, the vehicle air conditioner 310 is provided with the single IR sensor 337 in the passenger compartment to detect the temperature in the detection area around the driver's seat. However, the present invention can be applied to an air conditioner which is provided with a plurality of IR sensors or an IR sensor (so-called matrix IR sensor) capable of detecting temperatures in a plurality of detection areas in order to air-condition each zone in the passenger compartment.

Further, in the fourth to sixth embodiments, the LED 341a is used as notification means, but the notification means is not limited to this. For example, it is also recommended to display information that the temperature detected by the IR sensor 337 is abnormal, on a display part (not shown) provided in the operating unit 340.

Still further, in the fourth embodiment, the control device 330 determines that the temperature detected by the IR sensor 337 is abnormal on the basis of the relation to the detection value of the solar radiation sensor 336. However, the control device 330 can determine that the temperature detected by the IR sensor 337 is abnormal on the basis of relation to the detection value of means for detecting the other environmental conditions.

Still further, in the fifth embodiment has been described the control example in the normal control conditions, and in the sixth embodiment has been described the control example in the control conditions given consideration to warming up the engine. However, it is also recommended to control the air conditioner in combination of these control conditions of the fifth and sixth embodiments.

Still further, the numerical values such as 10 seconds, 500 W/m, 0.5° C., 3 times, 2° C., and 5 minutes in the above respective embodiments are examples and can be set at proper values according to various characteristics and the like of the vehicle and the air conditioner.

Such changes and modifications are to be understood as being within the scope of the present invention as defined by the appended claims.

What is claimed is:

1. An air conditioner for a vehicle, comprising:
a non-contact temperature sensor that detects a temperature in a predetermined area of a passenger compartment in non contact;
a control unit that controls an air state in the passenger compartment based on at least the temperature detected by the non-contact temperature sensor;
determining means for determining whether or not the temperature detected by the non-contact temperature sensor corresponds to an actual temperature of the passenger compartment;
notifying means for notifying a passenger whether the temperature detected by the non-contact temperature sensor does not correspond to the actual temperature of the passenger compartment;
an outside air temperature sensor for detecting a temperature of outside air of the passenger compartment; and
a water temperature sensor for detecting a temperature of water for cooling a vehicle engine; wherein
even when the temperature detected by the non-contact temperature sensor does not correspond to the actual temperature of the passenger compartment, the notifying means does not notify a passenger in the passenger compartment when the temperature of outside air detected by the outside air temperature sensor is lower than a predetermined air temperature; and
even when the temperature detected by the non-contact temperature sensor does not correspond to the actual temperature of the passenger compartment, the notifying means does not notify a passenger in the passenger compartment when the temperature of outside air detected by the outside air temperature sensor is lower than the predetermined air temperature and when the temperature of water detected by the water temperature sensor is lower than a predetermined water temperature.

2. The air conditioner according to claim 1, wherein the non-contact temperature sensor is disposed at an attachment position that is changeable in the passenger compartment.

3. The air conditioner according to claim 1, wherein the notifying means is a light emitting device that is arranged at a position adjacent the non-contact temperature sensor.

4. The air conditioner according to claim 1, wherein the determining means determines whether the temperature detected by the non-contact temperature sensor at the present time does not correspond to the actual temperature of the passenger compartment based on a temperature detected by the non-contact temperature sensor at a time before a predetermined time period from the present time.

5. The air conditioner according to claim 1, further comprising
a temperature displaying portion that displaces a set temperature for controlling the air state in the passenger compartment,
wherein the notifying means displaces a determination result of the determining means by using the temperature displaying portion.

6. The air conditioner according to claim 1, further comprising
environment condition detection means for detecting an environment condition except for the temperature detected by the non-contact temperature sensor, wherein:
the control unit controls the air state in the passenger compartment based on the temperature detected by the non-contact temperature sensor and the environment condition detected by the environment condition detection means; and the determining means determines whether the temperature detected by the non-contact temperature sensor corresponds to the actual temperature of the passenger compartment based on the environment condition detected by the environment condition detection means.

7. The air conditioner according to claim 6, wherein the environment condition detection means is a solar radiation detection means for detecting a solar radiation amount entering into the passenger compartment.

8. The air conditioner according to claim 6, wherein:
the environment condition detection means includes an outside air detection means for detecting a temperature of outside air outside the passenger compartment; and
the determining means determines that the temperature detected by the non-contact temperature sensor corresponds to the actual temperature of the passenger compartment when the temperature detected by the non-contact temperature sensor corresponds to the temperature of outside air, detected by the outside air temperature sensor.

9. The air conditioner according to claim 1, wherein the determining means determines whether the temperature detected by the non-contact temperature sensor corresponds to the actual temperature of the passenger compartment based on whether the temperature detected by the non-contact temperature sensor is within a predetermined range for a predetermined time.

10. The air conditioner according to claim 1, wherein the predetermined area includes a plurality of temperature detection ranges.

11. The air conditioner according to claim 1, further comprising
an opening state determining unit for determining an opening state of a door or a window of the vehicle,
wherein the determining means determines that the temperature detected by the non-contact temperature sensor corresponds to the actual temperature of the passenger compartment when the opening state determining unit determines the opening state of the door or the window.

12. The air conditioner according to claim 1, wherein:
when the determining means determines that the temperature detected by the non-contact temperature sensor does not correspond to the actual temperature in the passenger compartment, a provisional temperature is set as the temperature in the predetermined area, and the control unit controls the air state in the passenger compartment based on the provisional temperature.

13. The air conditioner according to claim 1, wherein the determining means determines whether the temperature detected at the present time by the non-contact temperature sensor does not correspond to the actual temperature in the passenger compartment, based on the temperature detected at a previous time by the non-contact temperature sensor and the temperature detected at the present time by the non-contact temperature sensor.

14. The air conditioner according to claim 1, wherein:
the non-contact temperature sensor is arranged in a dashboard of the passenger compartment to face a driver's seat area, at a side opposite to a steering wheel with respect to a center portion of the dashboard in a vehicle lateral direction.

15. An air conditioner for a vehicle, comprising:
a non-contact temperature sensor that detects a temperature in a predetermined area of a passenger compartment in non contact;
a control unit that controls an air state in the passenger compartment based on at least the temperature detected by the non-contact temperature sensor;
determining means for determining whether or not the temperature detected by the non-contact temperature sensor is abnormal; and
notifying means for notifying a passenger whether the temperature detected by the non-contact temperature sensor is abnormal; wherein
the determining means determines whether the temperature detected by the non-contact temperature sensor corresponds to the actual temperature of the passenger compartment based on whether a state where the temperature detected by the non-contact temperature sensor is within a predetermined range for a predetermined time.

16. A control process of a computer for a vehicle air conditioner that includes a non-contact temperature sensor for detecting a temperature of a predetermined area in a passenger compartment of the vehicle in non-contact and a control unit for controlling an air state in the passenger compartment based on the temperature detected by the non-contact temperature sensor, the control process comprising:
determining whether the temperature detected by the non-contact temperature sensor does not correspond to the actual temperature in the passenger compartment; and
notifying a determination result in the determining step to a passenger in the passenger compartment; wherein
the determining step includes determining whether the temperature detected by the non-contact temperature sensor corresponds to the actual temperature of the passenger compartment based on whether a state where the temperature detected by the non-contact temperature sensor is within a predetermined range for a predetermined time.

17. The control process according to claim 16, wherein an attachment position of the non-contact temperature sensor is changeable.

* * * * *